United States Patent
Kure et al.

(10) Patent No.: US 9,949,045 B2
(45) Date of Patent: Apr. 17, 2018

(54) METHOD AND SYSTEM FOR MODELING A CUSTOM FIT EARMOLD

(71) Applicants: Oticon A/S, Smørum (DK); Bernafon AG, Berne (CH)

(72) Inventors: Gabriel Kure, Smørum (DK); Monika Bertges Reber, Heitenried (CH); Karsten Bo Rasmussen, Smørum (DK)

(73) Assignees: BERNAFON AG, Berne (CH); OTICON A/S, Smørum (DK)

( * ) Notice: Subject to any disclaimer, the term of this patent is extended or adjusted under 35 U.S.C. 154(b) by 336 days.

(21) Appl. No.: 14/825,647

(22) Filed: Aug. 13, 2015

(65) Prior Publication Data
US 2016/0057552 A1    Feb. 25, 2016

(30) Foreign Application Priority Data
Aug. 14, 2014  (EP) .................................... 14180990

(51) Int. Cl.
*H04R 25/00*    (2006.01)
*G06T 17/00*    (2006.01)

(52) U.S. Cl.
CPC ........... *H04R 25/652* (2013.01); *G06T 17/00* (2013.01); *H04R 25/65* (2013.01); *H04R 2225/77* (2013.01)

(58) Field of Classification Search
None
See application file for complete search history.

(56) References Cited

U.S. PATENT DOCUMENTS

2007/0189564 A1    8/2007 McBagonluri et al.
2015/0073262 A1*   3/2015 Roth .................... A61B 5/1077
                                                 600/411

FOREIGN PATENT DOCUMENTS

| DE | 10 2009 013 286 A1 | 9/2010 |
| EP | 1 909 537 A2 | 4/2008 |
| EP | 1 939 776 A2 | 7/2008 |
| EP | 2 190 220 A2 | 5/2010 |

* cited by examiner

*Primary Examiner* — Michelle Chin
(74) *Attorney, Agent, or Firm* — Birch, Stewart, Kolasch & Birch, LLP

(57) ABSTRACT

According to an embodiment, a hearing aid comprising a custom-fit ear mold is disclosed. The custom fit ear mold includes a retention part comprising a structure adapted to lock anatomically with at least one point at a surface of the pinna and/or ear canal when the custom-fit earmold is positioned in the pinna and/or ear canal of the user. The at least one point represents at least one retention point selected from the plurality of retention possibility points (RPPs), wherein each RPP of the plurality of the RPPs comprises a point wherein a normal, at the RPP, to a tangent plane containing the RPP intersects at another point at surface of the pinna and/or ear canal such that the another point is proximal to a tympanic membrane of the user compared to position of the RPP relative to the tympanic membrane.

18 Claims, 12 Drawing Sheets

EAR VOLUME SIDE

METHOD AND SYSTEM FOR MODELING A CUSTOM FIT EARMOLD

FIELD

The disclosure relates to a custom fit earmold. In particular, the disclosure relates to a method and system for modeling, which may include manufacturing, the earmold that is adapted to be comfortably and securely retained in a pinna and/or ear canal of a hearing device user.

BACKGROUND

Figure 1A:
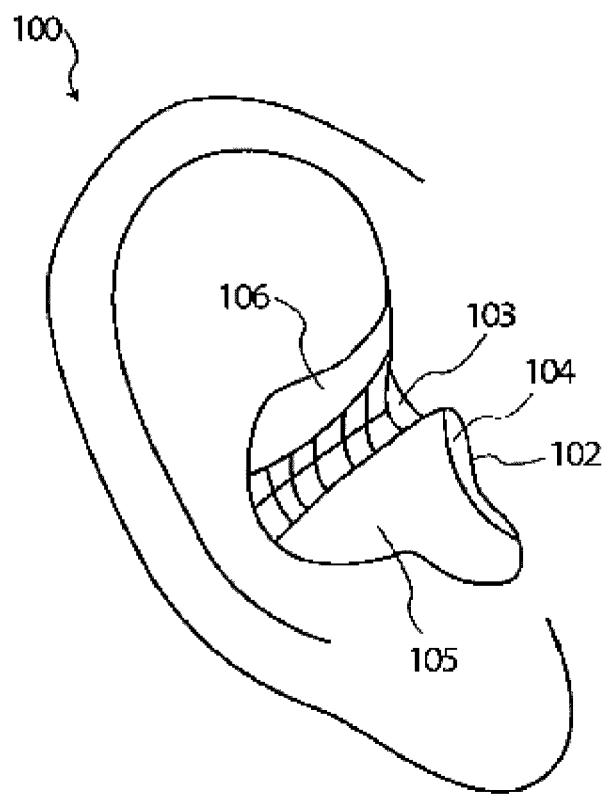
Figure 1B:
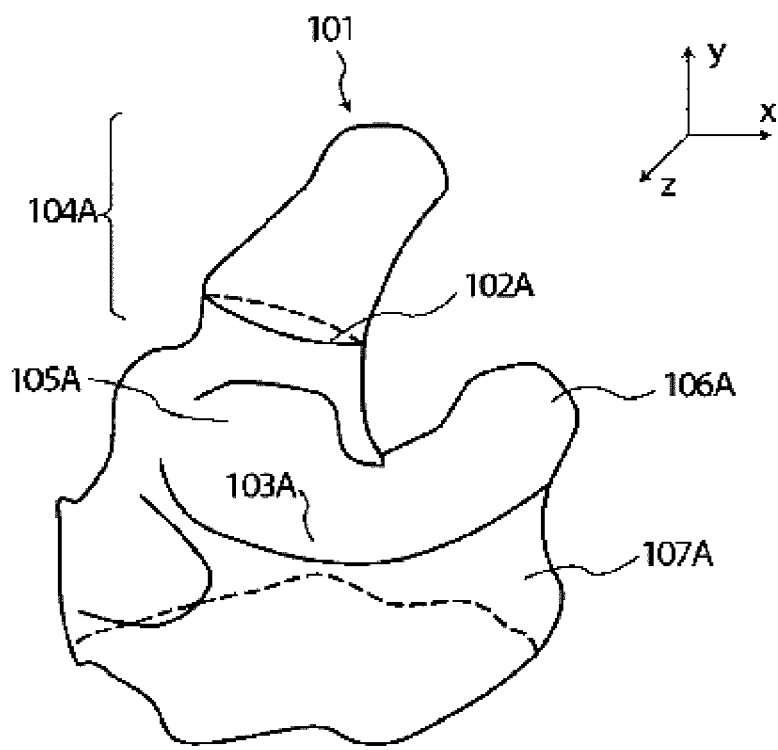

Most hearing devices include an earmold which is inserted and retained in the pinna and/or the ear canal of the user. Some hearing devices like headphones or earphones use standard sized earmold to fit a number of listeners. Unfortunately, such standard earmolds offer poor fit and poor comfort to the hearing device user. While for other hearing devices like in hearing aids, a customized earmold is generally produced. FIG. 1A illustrates a diagram of a human ear that is, for example, the ear of a user of the hearing device. Specifically, the ear 100 has various identifiable parts, or features, such as, for example, aperture 102, crus 103, canal 104, concha 105 and cymba 106. As one skilled in the art will recognize, in order to produce a customized earmold for a patient, an ear impression is typically taken. Various processes for taking such ear impressions have been developed, but most such processes typically involve an audiologist using a quick foam that is cured to make a mold of the patient's ear, including that of the ear canal. For this purpose, the foam is introduced into the ear of the patient (user), and the foam may be cured by using conventional curing methods. The cured mold is then removed and the cured mold provides an impression including contours of the different parts of the ear, such as parts 102-106 of FIG. 1A. Such an ear impression reflecting the parts of ear 100 of FIG. 1A is shown in FIG. 1B. More particularly, ear impression 101 has aperture portion 102A corresponding to aperture 102 of FIG. 1A; crus portion 103A corresponding to crus 103 of FIG. 1A; canal portion 104A corresponding to canal 104 in FIG. 1A; concha portion 105A corresponding to concha 105 of FIG. 1A; cymba portion 106A corresponding to cymba 106; and lower body portion 107A.

The cured mold is then sent to a manufacturing site for producing a hearing aid with the customized mold for that particular patient. Even though this customized mold is useful relative to the standard earmold, multiple iterations may be required in order to achieve the earmold that provides a satisfactory fit for the patient.

In hearing aids, the design of the earmold also considers acoustic parameters such as feedback and occlusion issues for providing an acceptable fit. However, the satisfactory fit of the custom-fit earmold for the hearing device is generally described in terms of comfortable fit and retention capability of the custom-fit earmold in the ear and/or ear canal of the user. Retention of the earmold in the ear canal is typically accomplished by friction. Friction is created by radial pressure of the earmold on the wall of the ear canal. The more pressure, the greater is the retention force.

However, friction is dependent on lubricants between the earmold and the wall of the canal. The presence of cerumen (ear wax), perspiration or water significantly reduces friction retention. Retention of the earmold based on friction is also susceptible to loosening caused by forces, like forces exerted on the earmold by jaw movement, which tends to dislodge the earmold from its desired position.

Furthermore, existing literature proposes incorporating Electroencephalography (EEG) electrodes in hearing aids. However, it is essential to ensure good skin contact with electrodes in order to obtain reliable noise free EEG signals during daily use of the hearing aid.

Therefore, there is a need of a solution allowing for modeling, including a mathematical image representation and/or manufacturing, a custom-fit earmold that offers a comfortable, stable and reliable fit in the ear canal of the user and may also provide a possible positioning of the EEG electrodes on the custom fit ear mold.

SUMMARY

According to an aspect, a method for modeling a custom-fit earmold adapted to be securely retained in a pinna and/or ear canal of a user is disclosed. The method includes obtaining a three-dimensional image of the pinna and/or ear canal of the user. The three-dimensional image includes a plurality of points available at an inner surface of the image wherein the plurality of points represent corresponding points at a surface of the pinna and/or ear canal. Thereafter, using a processing unit adapted to run an image analysis module comprising an identifier on a computing device, the three-dimensional image is processed. The processing includes identifying a plurality of retention possibility points (RPPs) from the plurality of points. The identifying the plurality of RPPs includes designating an analyzed point selected, using a selector tool of the image analysis module, from the plurality of points as an RPP if a normal, at the analyzed point, to a tangent plane containing the analyzed point intersects at another point at the inner surface of the three-dimensional image. The another point is proximal to a tympanic membrane of the user compared to position of the analyzed point relative to the tympanic membrane. Lastly, the custom-fit earmold is modeled using using a modeler of the image analysis module. The earmold includes a retention part comprising a structure adapted to lock anatomically with at least one point at the surface of the pinna and/or ear canal when the custom-fit earmold is positioned in the pinna and/or ear canal of the user, the at least one point being represented by at least one retention point selected from the plurality of RPPs.

According to another embodiment, a hearing aid comprising a custom-fit ear mold is disclosed. The custom fit ear mold includes a retention part comprising a structure adapted to lock anatomically with at least one point at a surface of the pinna and/or ear canal when the custom-fit earmold is positioned in the pinna and/or ear canal of the user. The at least one point represents at least one retention point selected from the plurality of retention possibility points (RPPs), wherein each RPP of the plurality of the RPPs comprises a point wherein a normal, at the RPP, to a tangent plane containing the RPP intersects at another point at surface of the pinna and/or ear canal such that the another point is proximal to a tympanic membrane of the user compared to position of the RPP relative to the tympanic membrane.

According to another embodiment, a computing device for producing a custom-fit earmold adapted to be securely retained in a pinna and/or ear canal of a user is disclosed. The device includes a processing unit adapted to run an image analysis module. The image analysis module includes an identifier adapted to identify a plurality of retention possibility points (RPPs) from a plurality of points available at an inner surface of a three-dimensional image of the pinna and/or ear canal; the plurality of points representing corresponding points at a surface of the pinna and/or ear canal. The image analysis module is further adapted to define a tangent plane containing the analyzed point; define a normal, at an analyzed point, to the defined tangent; determine whether the defined normal intersects at another point at the inner surface of the three-dimensional image; and designate the analyzed point as RPP if the another point is proximal to a tympanic membrane of the user compared to position of the analyzed point relative to the tympanic membrane. The device further includes a selector tool and a modeler. The selector tool is adapted to select at least one retention point from the plurality of RPPs. The modeler is adapted to utilize the at least one retention point for developing a three-dimensional mathematical image representation of the custom-fit earmold comprising the retention part adapted to lock anatomically with at least one point at the surface of the pinna and/or ear canal when the custom-fit earmold is positioned in the pinna and/or ear canal of the user, the at least one point being represented by at least one retention point selected from the plurality of RPPs.

According to yet another embodiment, a computer program product is disclosed. The computer program product includes instructions, which when executed by the computing device, causes the device to identify a plurality of retention possibility points (RPPs) from a plurality of points available at an inner surface of a three-dimensional image of the pinna and/or ear canal; the plurality of points representing corresponding points at a surface of the pinna and/or ear canal. The identification includes defining a tangent plane containing the analyzed point, defining a normal, at an analyzed point, to the defined tangent, determining whether the defined normal intersects at another point at the inner surface of the three-dimensional image, and designating the analyzed point as RPP if the another point is proximal to a tympanic membrane of the user compared to position of the analyzed point relative to the tympanic membrane. The execution of the instructions further causes the device to select at least one retention point from the plurality of RPPs; and utilize the at least one retention point for developing a three-dimensional mathematical image representation of the custom-fit earmold comprising the retention part adapted to lock anatomically with at least one point at the surface of the pinna and/or ear canal when the custom-fit earmold is positioned in the pinna and/or ear canal of the user, the at least one point being represented by at least one retention point selected from the plurality of RPPs.

BRIEF DESCRIPTION OF ACCOMPANYING FIGURES

Figure 2A:
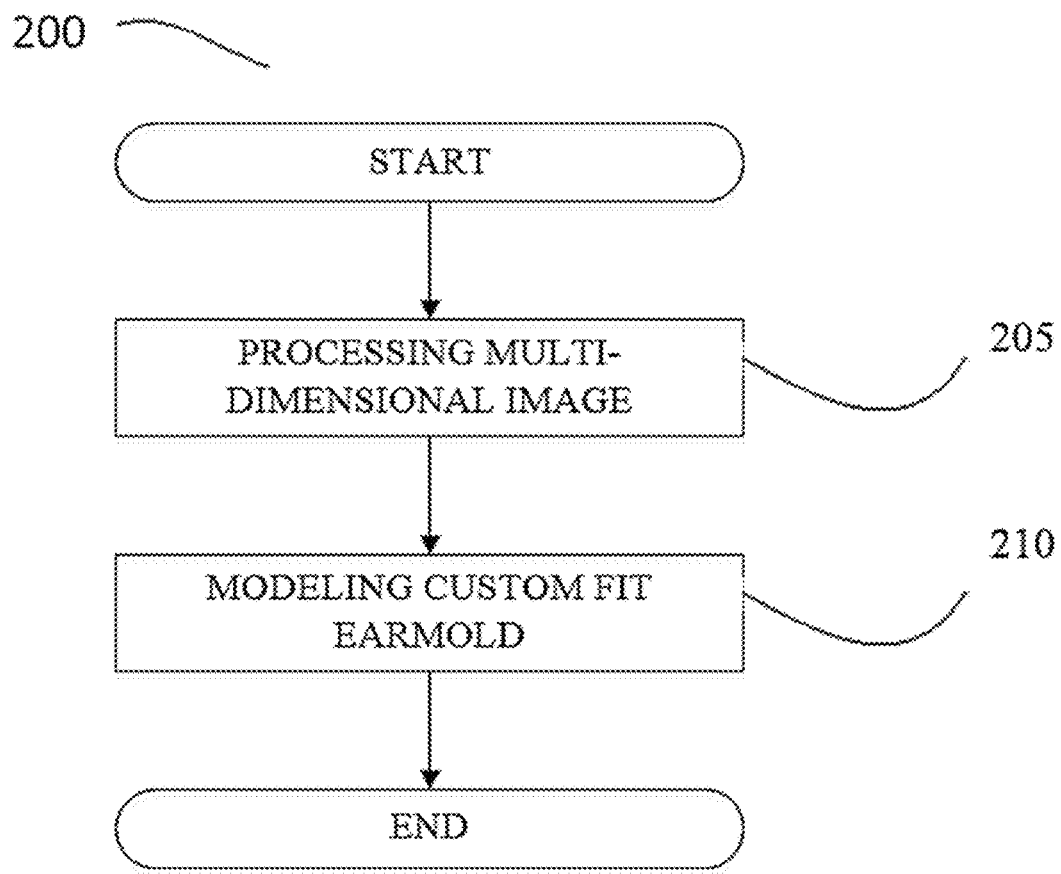
Figure 2B:
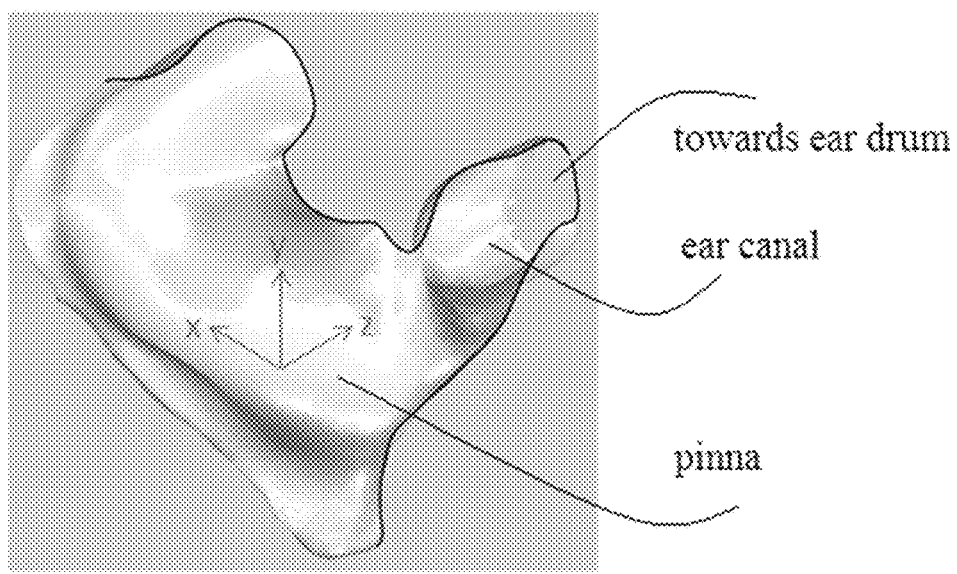
Figure 3A:
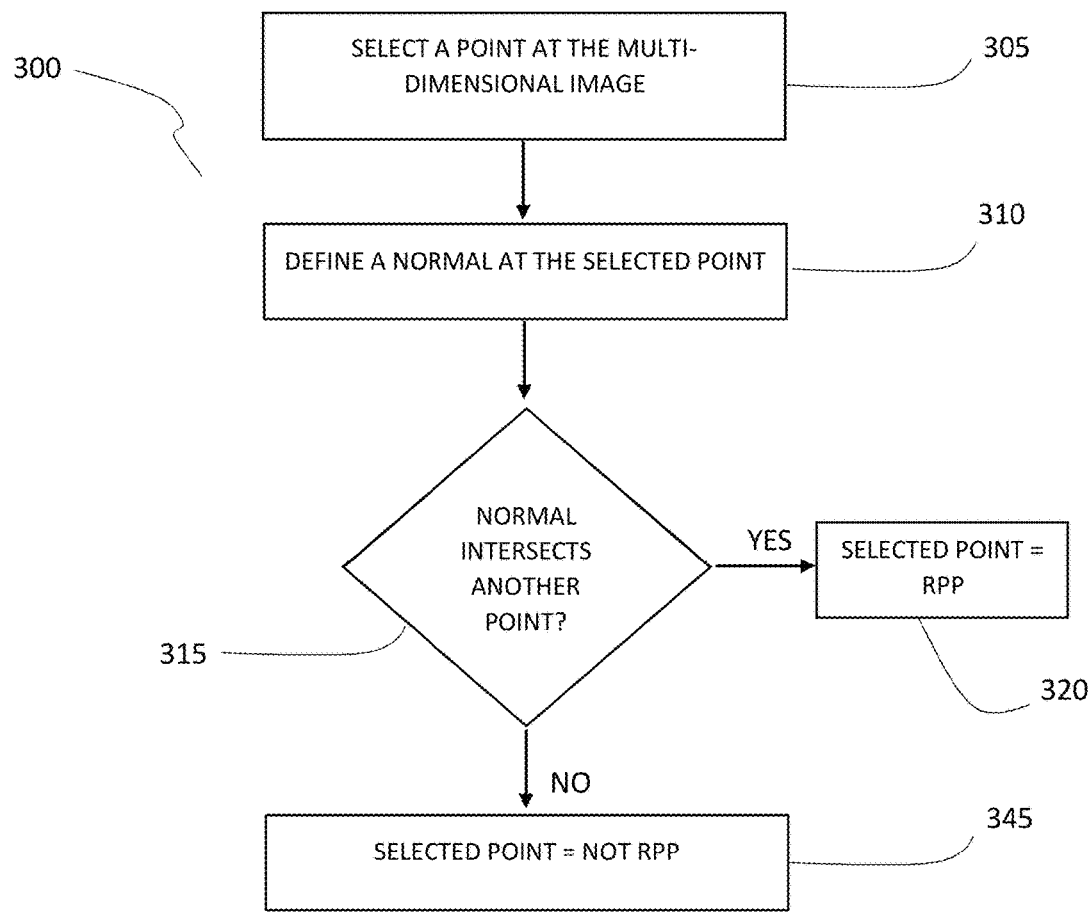
Figure 3B:
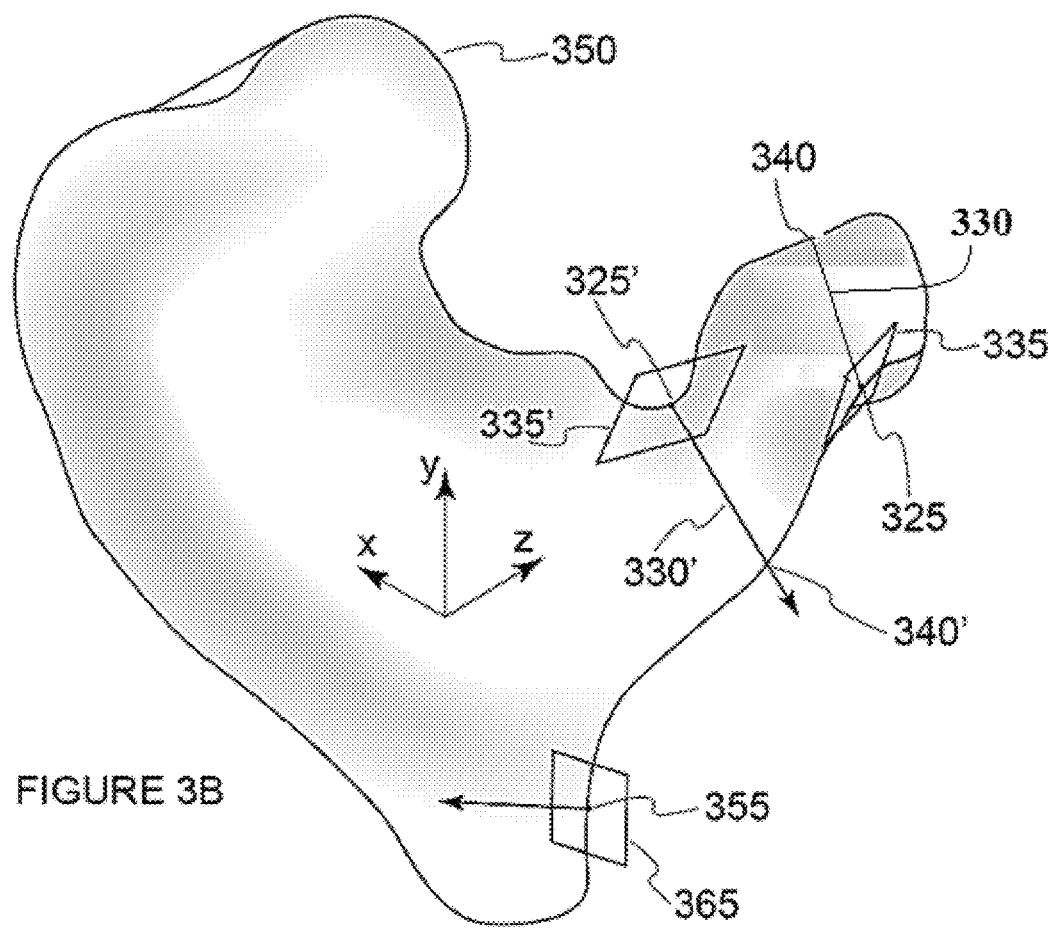
Figure 4:
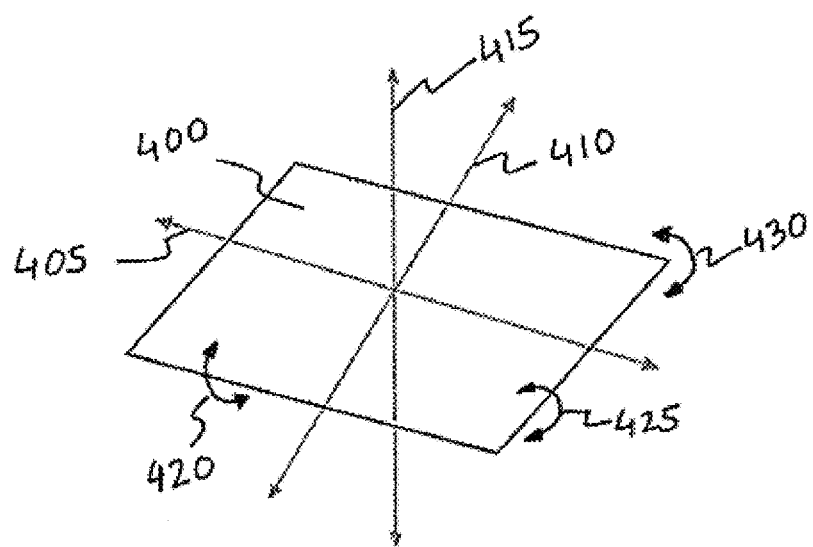
Figure 5:
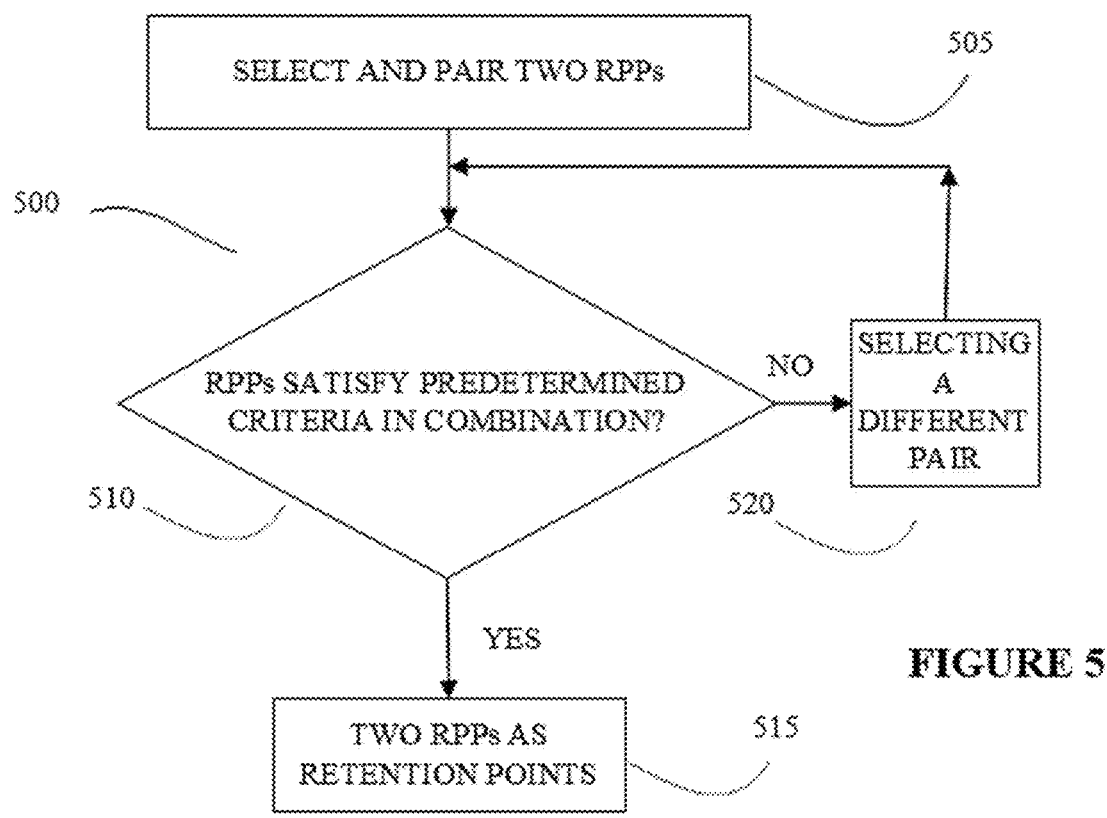
Figure 6B:
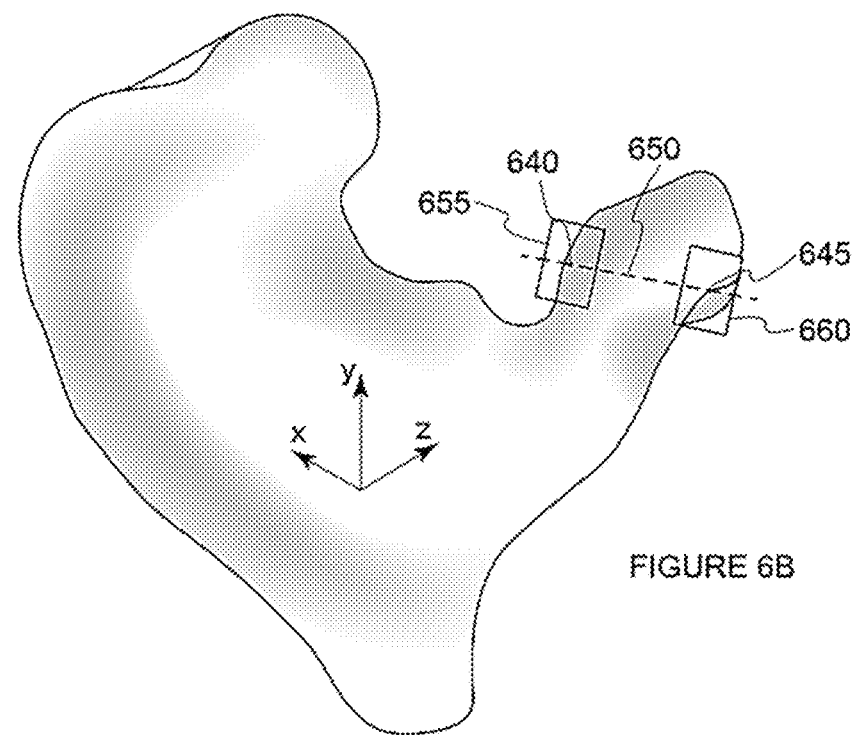
Figure 6A:
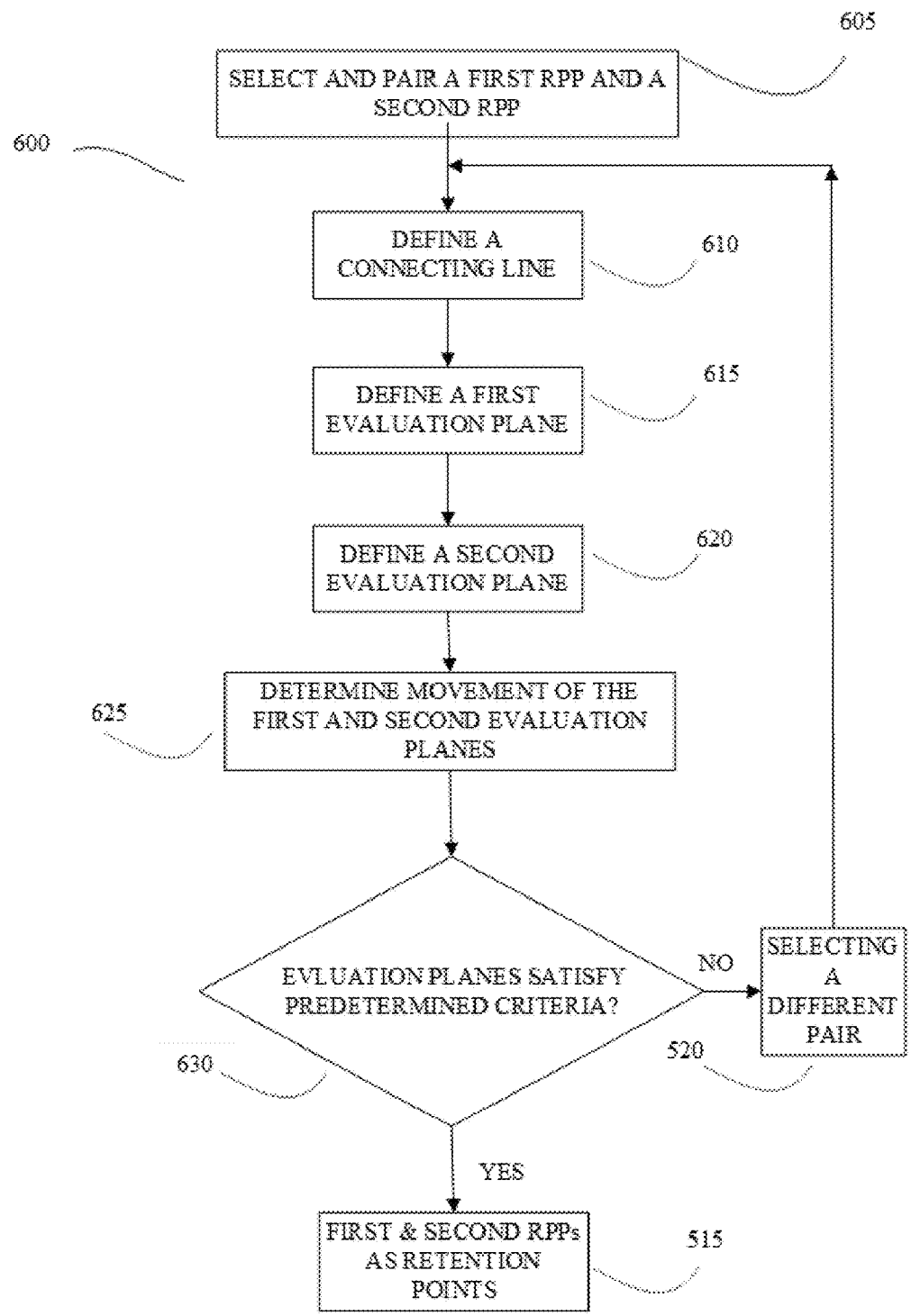
Figure 7A:
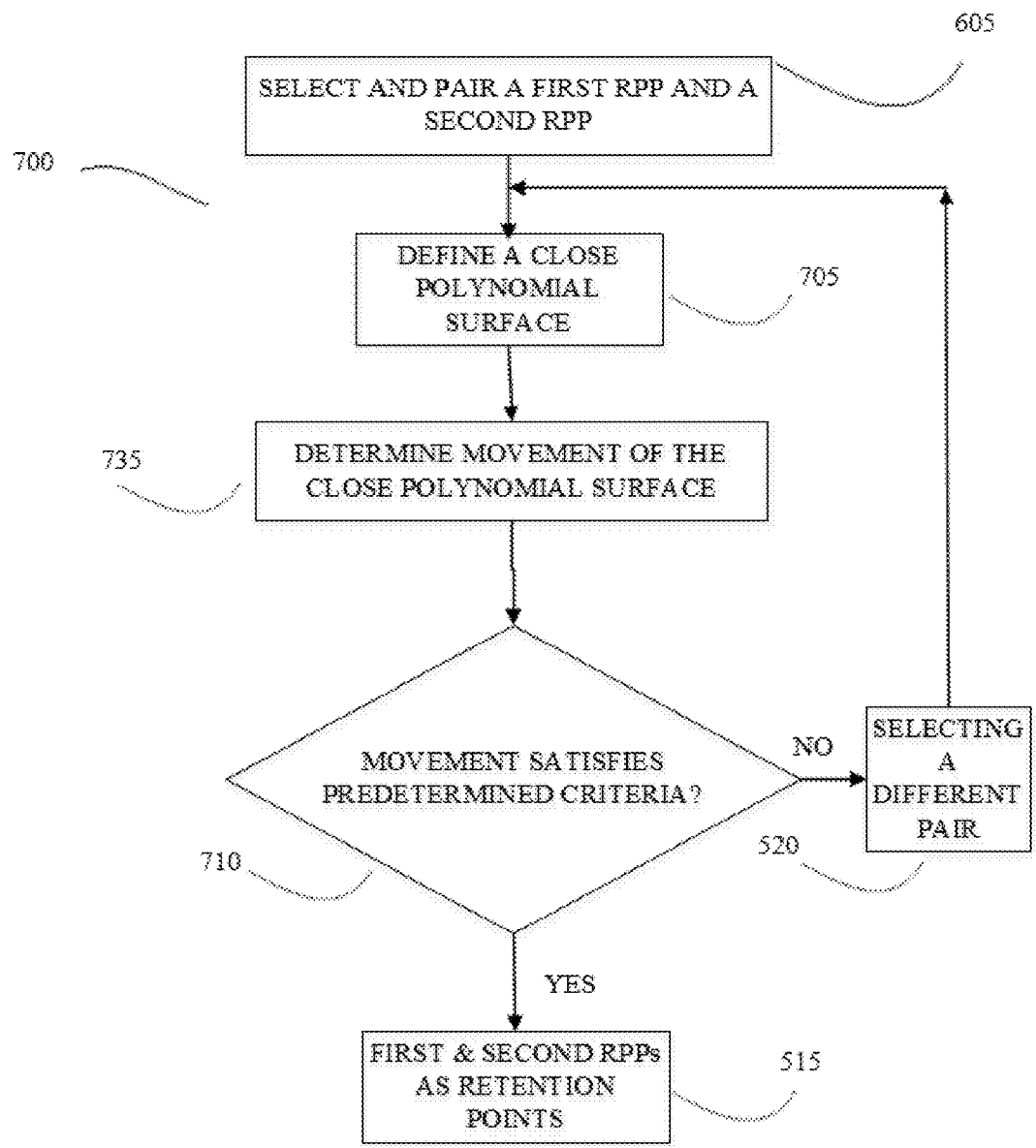
Figure 7B:
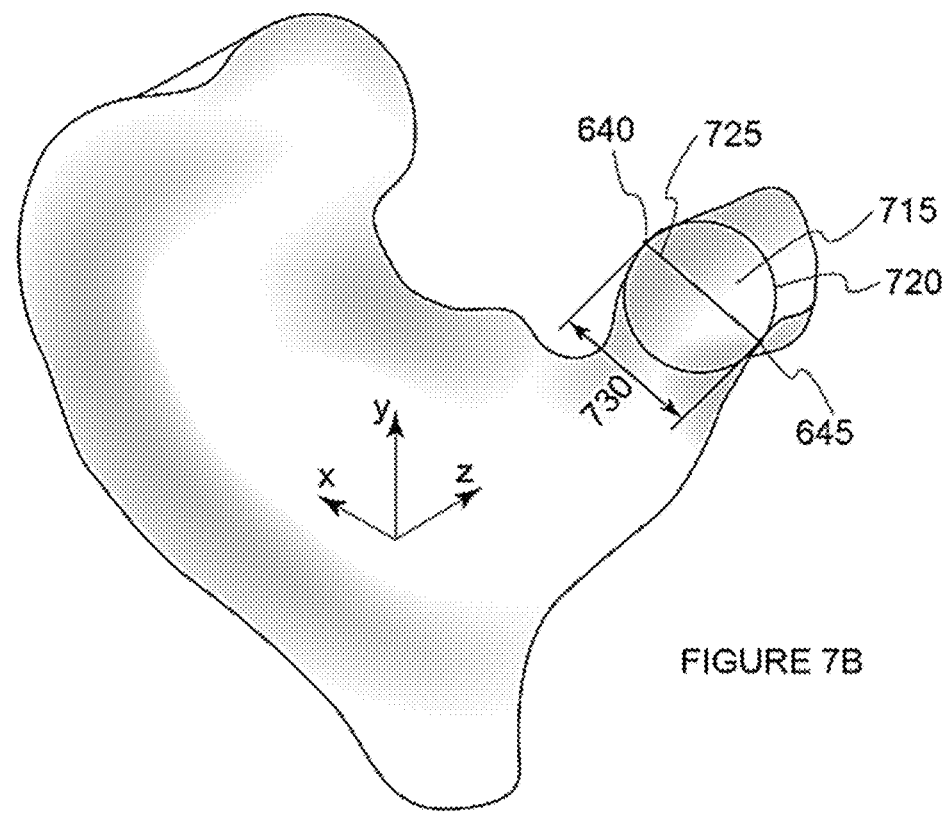
Figure 8:
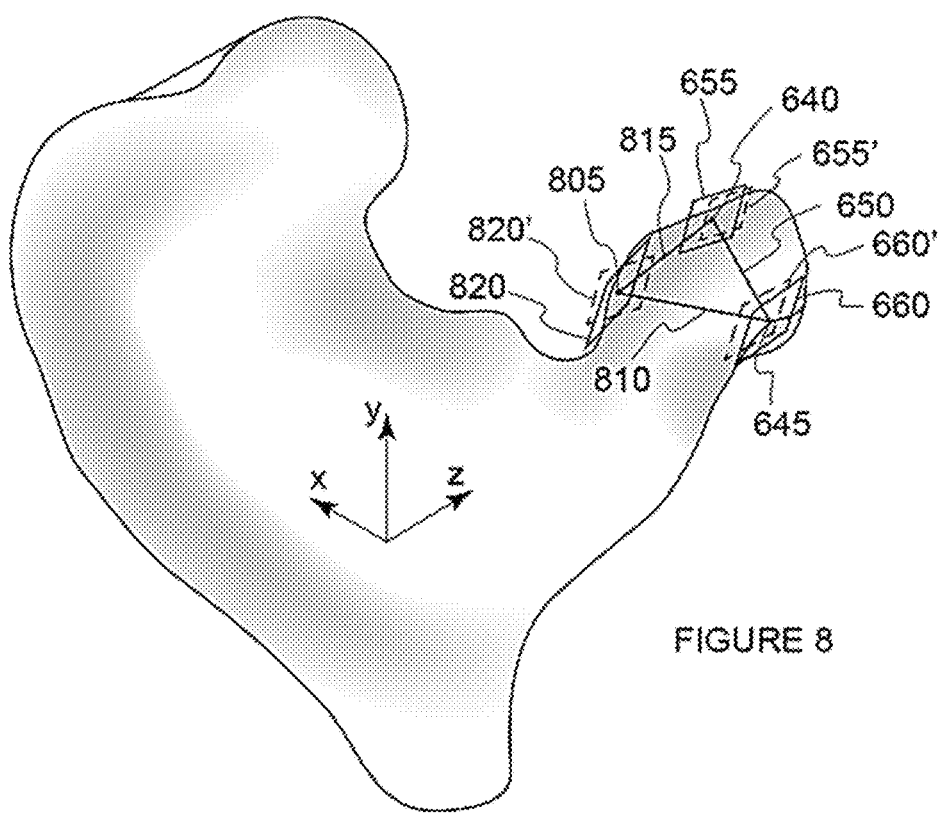
Figure 9A:
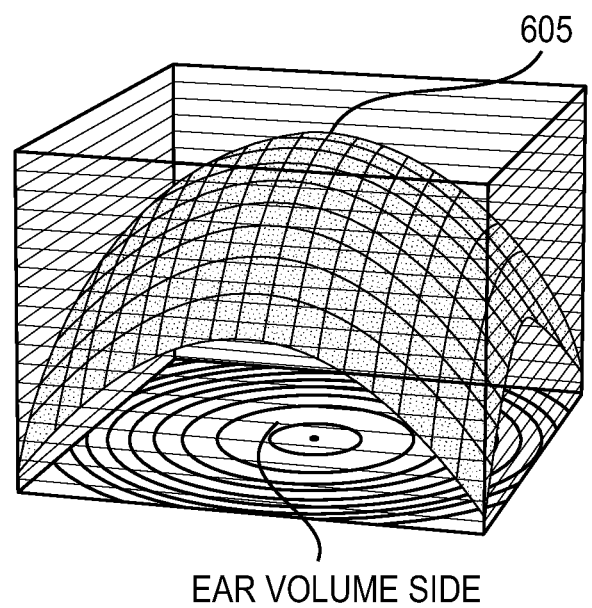
Figure 9B:
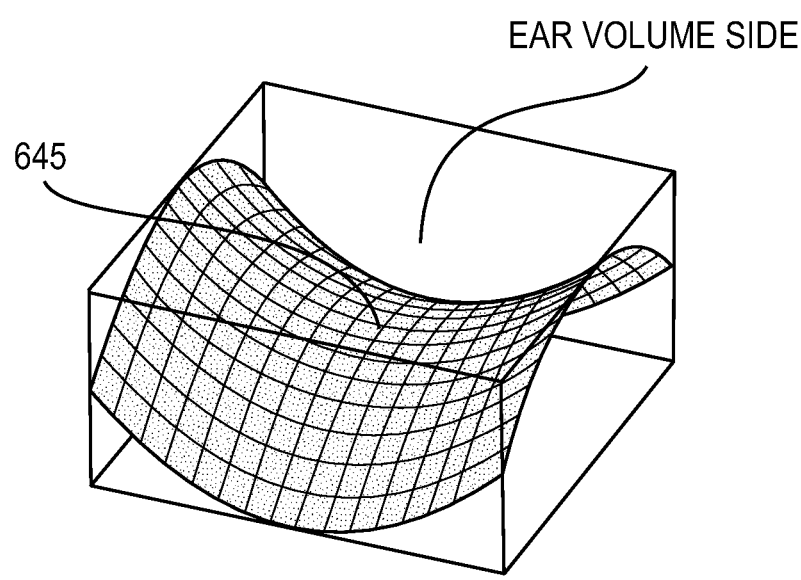
Figure 9C:
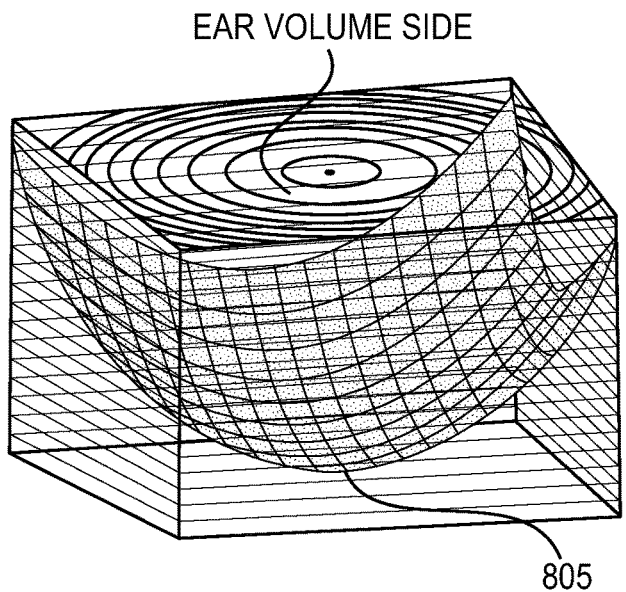
Figure 10:
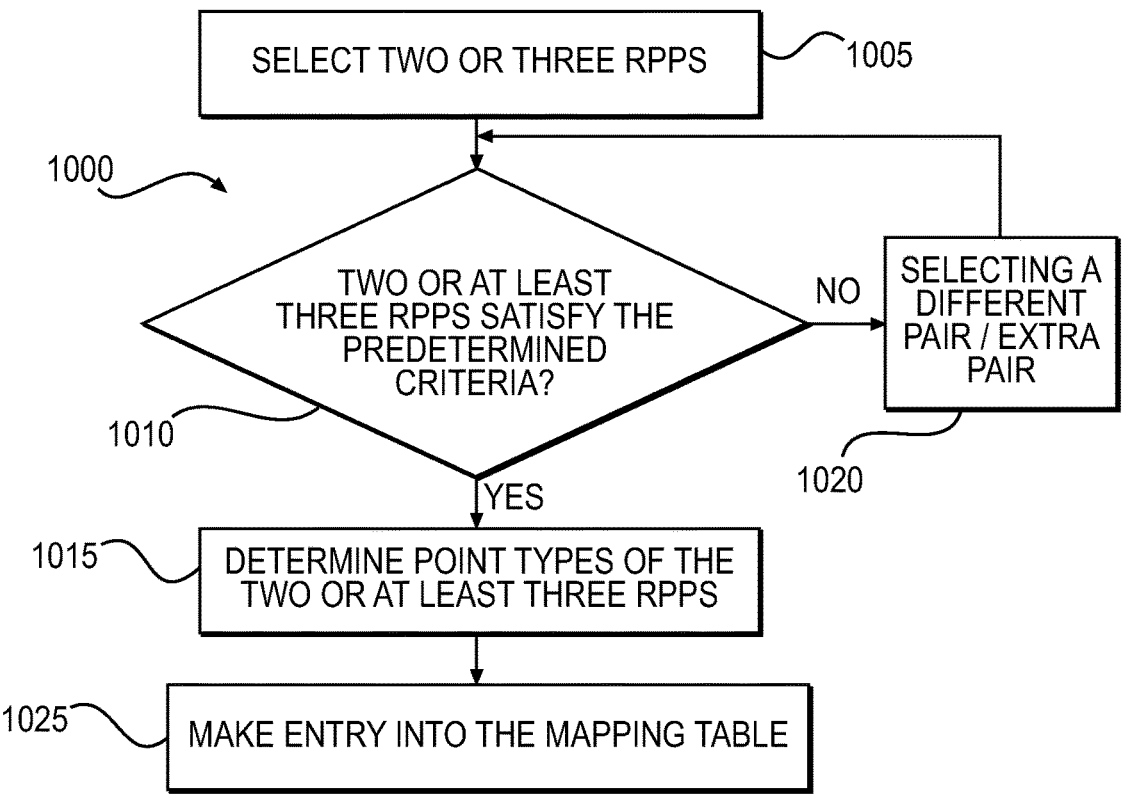
Figure 11B:
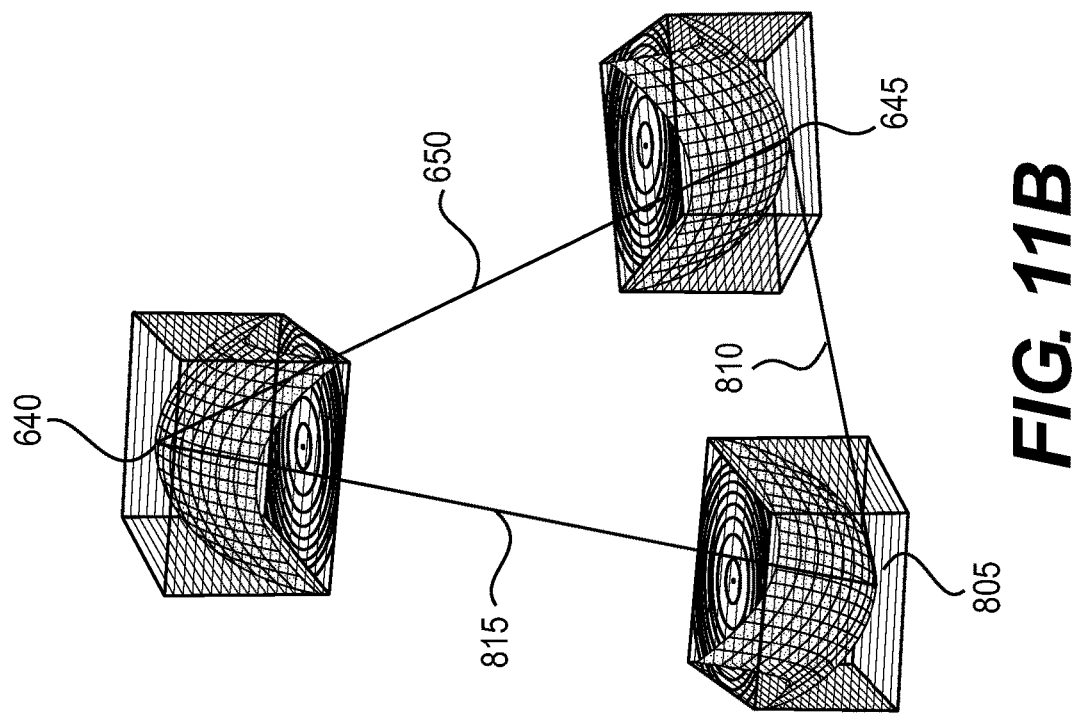
Figure 11A:
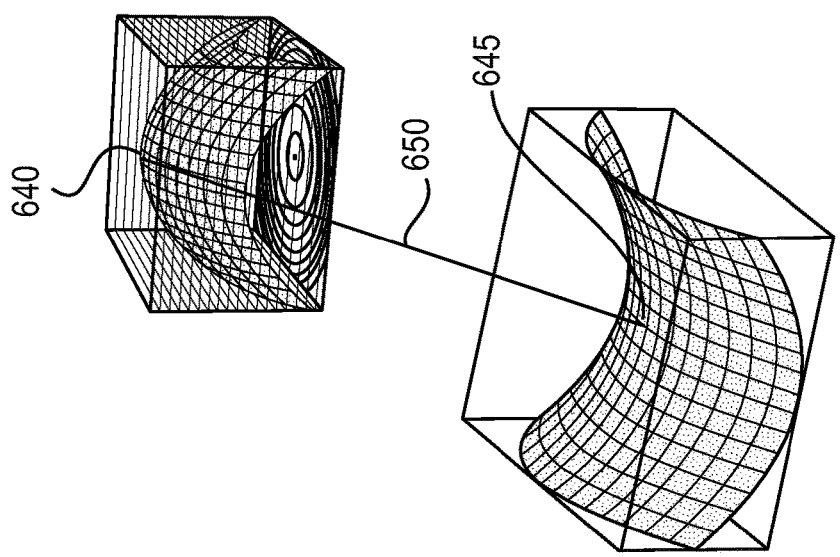
Figure 12:
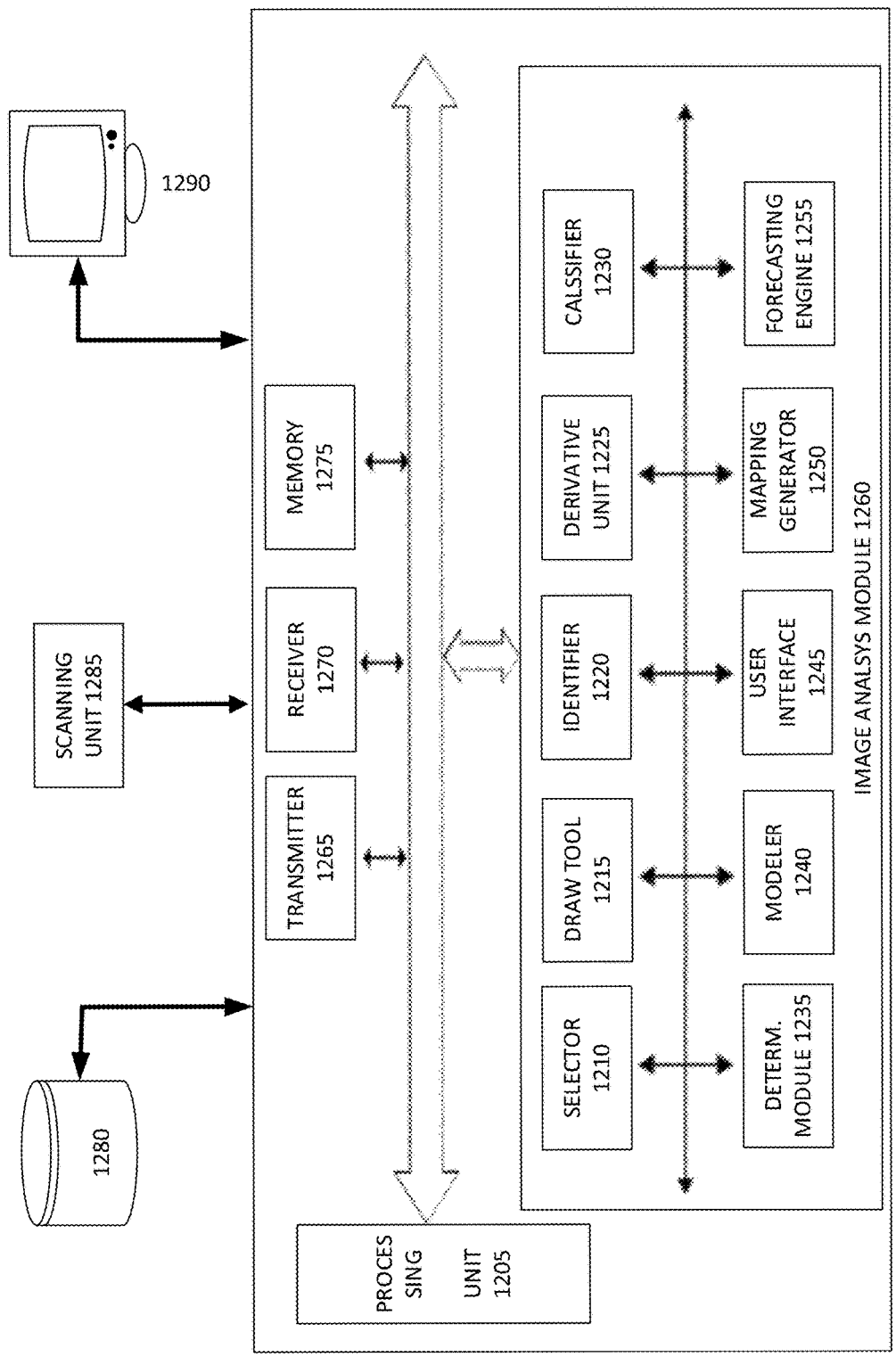

The embodiments of the disclosure, together with its advantages, may be best understood from the following detailed description taken in conjunction with the accompanying figures in which:

FIG. 1A illustrates a diagram of a human ear;
FIG. 1B illustrates mold impression of the human ear;
FIG. 2A illustrates a method for modeling a custom-fit earmold according to an embodiment of the disclosure;
FIG. 2B illustrates a three-dimensional image according to an embodiment of the disclosure;
FIG. 3A illustrates a method for modeling a custom-fit earmold according to another embodiment of the disclosure;
FIG. 3B illustrates the three-dimensional image showing the identification of a Retention Possibility Point (RPP) according to an embodiment of the disclosure;
FIG. 4 illustrates sliding movement and rotational movement, which are to be restricted or substantially restricted, according to an embodiment of the disclosure;
FIG. 5 illustrates a method of analyzing two RPPs in combination according to an embodiment of the disclosure;
FIG. 6A illustrates a movement evaluation technique for a pair basis RPPs according to an embodiment of the disclosure;
FIG. 6B illustrates a three-dimensional image showing a movement evaluation technique for a pair basis RPPs according to an embodiment of the disclosure;
FIG. 7A illustrates a movement evaluation technique for a pair basis RPPs according to an embodiment of the disclosure;
FIG. 7B illustrates a three-dimensional image showing a movement evaluation technique for a pair basis RPPs according to an embodiment of the disclosure;
FIG. 8 illustrates a three-dimensional image showing a movement evaluation technique for an extra-pair basis RPPs according to an embodiment of the disclosure;
FIG. 9A illustrates a local extrema (Maximum) according to an embodiment of the disclosure;
FIG. 9B illustrates a saddle point type according to an embodiment of the disclosure;
FIG. 9C illustrates a local extrema (Minimum) according to an embodiment of the disclosure;
FIG. 10 illustrates a method of preparing a mapping table according to an embodiment of the disclosure;
FIG. 11A illustrates an extrema point type RPP and a saddle point type RPP in a pair wise combination according to an embodiment of the disclosure;
FIG. 11B illustrates three extrema point type RPPs in an extra-pair wise combination according to an embodiment of the disclosure; and
FIG. 12 illustrates a computing device according to an embodiment of the disclosure.

DETAILED DESCRIPTION

The disclosed solution utilizes mechanical anatomical locking between the custom-fit earmold and the ear canal and/or ear for retaining the hearing device in the pinna and/or ear canal. For mechanical anatomical locking, the earmolds are prepared in order to fit complex anatomy of the pinna and/or ear canal by utilizing natural bends/contours of the pinna and/or ear canal. The interlocking of the earmold and the complex shapes and structures of the pinna and/or ear canal hold the hearing device in place, thus avoiding or substantially avoiding friction as the only retention method. The "substantially" refers to using mechanical locking as a significant contributor in retaining the earmold. In other words, the custom-fit earmold may be retained based on a combined effect of mechanical locking and friction. This significantly reduces the custom-fit earmold being susceptible to loosening caused by forces, like forces exerted on the earmold because of jaw movement, which tend to dislodge the earmold.

The hearing device is a device, which is worn adjacent to an individual's ear and/or in the ear/ear canal of the user. The hearing device includes an earmold that is positioned in the ear canal and/or ear (such as in pinna) of the user. The earmold may contain the electronics of the hearing device, including a receiver, or may be connected to the electronics, which are outside the pinna and/or ear canal. These devices may include ear protection plugs, swimming plugs, headsets, in-ear earphones, earplugs, hearing aids, health monitoring device, etc. For example, the health monitoring device is positioned in the pinna and/or in the ear canal and are adapted to measure body parameters like temperature, blood glucose etc. Even the hearing device may be integrated with health monitoring feature or other components as an EEG electrode. These hearing devices may serve different purposes. For example, ear protection plugs may prevent or substantially prevent acoustic signals from being perceived by the user. Whereas, hearing aids improves user's acoustical perception. With respect to the application area, a hearing device may be applied in the ear (ITE) type hearing aid devices, which encompassing various styles of full shell, half shell, In the Canal, CIC (Completely In the Canal), MIC (Micro in the Canal), and IIC (Invisible In the Canal).

Referring now to FIGS. 2A, 3A and 3B, a method for modeling a custom-fit earmold adapted to be securely retained in a pinna and/or ear canal of a user according to an embodiment is disclosed. The method (200, 300) includes obtaining a three-dimensional image of the pinna and/or ear canal of the user. The three-dimensional image includes a plurality of points available at an inner surface of the image wherein the plurality of points represent corresponding points at a surface of the pinna and/or ear canal. Thereafter, at 205, using a processing unit adapted to run an image analysis module comprising an identifier on a computing device, the three-dimensional image is processed. The processing includes identifying a plurality of retention possibility points (RPPs) from the plurality of points. The identifying the plurality of RPPs includes designating an analyzed point selected, using a selector tool of the image analysis module, from the plurality of points as an RPP if a normal, at the analyzed point, to a tangent plane containing the analyzed point intersects at another point at the inner surface of the three-dimensional image. The another point is proximal to a tympanic membrane of the user compared to position of the analyzed point relative to the tympanic membrane. Lastly, at 210, the custom-fit earmold is modeled using using a modeler of the image analysis module. The earmold includes a retention part comprising a structure adapted to lock anatomically with at least one point at the surface of the pinna and/or ear canal when the custom-fit earmold is positioned in the pinna and/or ear canal of the user, the at least one point being represented by at least one retention point selected from the plurality of RPPs.

FIG. 3A illustrates the steps of identification of the RPPs. At 305, a point at the three-dimensional image is selected using a selector tool. At 310, a normal at the selected point to a tangent plane that contains the selected point is made using a draw tool. At 315, a determination, using a determination module, is made whether the normal intersects at another point at surface of the three-dimensional image, where the another point is proximal to the ear drum compared to the analyzed point. If so, then at 320, the selected point is designated at the RPP, else not (as illustrated at 345). Thereafter, for identifying another RPPs, the steps may be repeated for another point of the three-dimensional surface. Typically, the normal is directed towards the side containing entrance to the ear canal and/or towards space that the ear canal encloses, i.e. the ear volume side. As illustrated in FIG. 3B, identification of the plurality of RPPs 325 (325') includes designating an analyzed point 325 (325') of the plurality of points as an RPP 325 (325') if a normal 330 (330'), at the analyzed point 325 (325'), to a tangent plane 335 (335') containing the analyzed point 325 (325') intersects at another point 340 (340') at the surface of the three-dimensional image 350, the another point being closer to the tympanic membrane compared to the analyzed point.

For illustrative purposes, a point 355 is shown, the point 355 is not an RPP because a normal 360, at the analyzed point 355, to a tangent plane 365 containing the analyzed point 355 fails to intersect at any other point at the surface of the three-dimensional image 350.

The three-dimensional image may be obtained using scanning techniques. These may include conventionally known scanning techniques such as computed tomography (CT), optical coherence tomography (OCT), etc.

The three-dimensional image (as shown in FIG. 2B) represents anatomical features of the pinna and/or ear canal of the user. This includes inner surface information along with natural bends including shape and structure of the ear pinna and/or ear canal. The image may thus represent tragus, anti-tragus, maximal and minimal aperture diameters, aperture ring, inter-tragal notch, crus saddle area, canal tip, concha boundary, concha depth, concha width, concha depth, ear canal length, ear canal shape and structure like first bend and second bend, etc. The inner surface comprises the surface that faces ear volume side of the pinna and/or ear canal. Therefore, each point in the three-dimensional image represents a unique point on the surface of the pinna and/or ear canal.

Another aspect for defining the three-dimensional image, additionally or alternatively, also addresses movement of the pinna and/or ear canal by utilizing time-resolved CT data acquisition technique to develop a higher-dimensional image that consists of three dimensional information that changes with time. This allows for substantially removing motion artifacts that result from interplay effects between the image acquisition scan plane and ear motion. As an exemplary illustration, a four dimension computed tomography may be obtained by oversampled CT data acquisition. This may include using multiple images that are captured within predetermined equal or unequal time gaps over an image acquisition time. Each of these images represents a different anatomical state of the pinna and/or ear canal during the image acquisition time. For example, in one scenario, these multiple images are captured by taking into account jaw movement such as when the patient (user) moves his jaw from a closed position to an open position and back to the closed position. The time taken to move the jaw would determine the image acquisition time. The jaw movement would cause changes in anatomical representation of the pinna and/or ear, thus affecting the identification of the RPPs. For more reliable retention, the three-dimensional image includes these multiple images and for modeling the custom-fit earmold, the RPPs may be identified from same or different images of these multiple images. Other motion-temporal based changes in the anatomical representation may also be considered for identifying the RPPs and/or retention point(s).

In yet another aspect, the three-dimensional image includes a forecasted three-dimensional image that includes forecast of the anatomy of the pinna and/or ear canal for a specified time in future. The forecast is based on evaluating the changes in the anatomy, as represented in the at least latest two three-dimensional images or two of the earlier three-dimensional images of the user, in relation to the time difference between the acquisition of the individual image of the at least latest two three-dimensional images or two of the earlier three-dimensional images. More than two previously captured three-dimensional images may be used in order to define a better trend in changes in anatomy of the user's pinna and/or ear canal and increasing reliability of the three-dimensional image having the forecasted anatomy. The RPPs may be identified from the latest acquired three-dimensional image. Additionally or alternatively, the RPPs may be identified from the latest acquired three-dimensional image and the three-dimensional image that includes anatomy forecast. Using the forecast allows for ensuring that the custom-fit earmold comfortably fits the user not only when the earmold is modeled but also during user's earmold use in future.

The Retention Possibility Point (RPP) is available on the three-dimensional image. The RPP is a point, whose corresponding point at the anatomical surface of the pinna and/or ear canal is likely to provide or provides the mechanical locking with the retention part of the custom-fit earmold when the custom-fit earmold is positioned in the pinna and/or ear canal. Therefore, identification of the RPP allows for shortlisting/creating a set of selectable anatomical surface points, i.e. points at the surface of the pinna and/or ear canal, that may be used as retention points for the mechanical locking.

The retention point(s) is available on the three-dimensional image, the retention point(s) being selected from the plurality of RPPs. The retention point(s) is a point, whose corresponding point at the anatomical surface of the pinna and/or ear is used to model the custom-fit earmold in order to provide the mechanical locking with the retention part of the custom-fit earmold when the custom-fit earmold is positioned in the pinna and/or ear canal. In other words, a retention part of the custom-fit earmold interacts with the corresponding retention point(s) at the anatomical surface of the pinna and/or ear canal and provides the mechanical locking of the custom-fit earmold in the pinna and/or ear canal because of the interaction.

In one aspect, modeling the custom-fit earmold includes developing, using the modeler of the image analysis module, a three-dimensional mathematical image representation of the custom-fit earmold comprising the retention part that is adapted to lock anatomically with one or more retention point(s) selected from the plurality of RPPs. Additionally or alternatively, modeling the custom-fit earmold includes manufacturing the custom-fit earmold comprising the retention part adapted to lock anatomically with the at least one point at the surface of the pinna and/or ear canal when the custom-fit earmold is positioned in the pinna and/or ear canal of the user. The at least one point is represented by at least one retention point selected from the plurality of RPPs. Thus, this embodiment includes making physical earmolds, which may typically made of a material selected from a group consisting of acrylic, vinyl, and silicone.

In another aspect, the custom-fit earmold is modeled utilizing at least two retention points selected from the plurality of RPPs, the at least two retention points in combination satisfy a predetermined criteria (described later). Comfortable and reliable retention of the custom-fit earmold in the pinna and/or ear canal is a function of the RPPs in combination satisfying the predetermined criteria.

In different aspects, as part of the modeling, the custom-fit earmold is provided with the retention part. The retention part comprises a structure that is adapted to lock anatomically the custom-fit earmold in the pinna and/or ear canal. This retention part is adapted to interact with at least one point(s) in the pinna and/or ear canal when the ear mold is positioned in the pinna and/or ear canal of the user. The point(s) correspond to the at least one retention point or at least two retention points in combination that satisfy the predetermined criteria.

In various aspects, the predetermined criteria includes restrictive or substantially restrictive sliding movement and/or rotational movement, with respect to the pinna and/or ear canal, of the ear mold comprising the retention part through anatomical locking with at least one point of the pinna and/or ear canal ear when the ear mold is positioned in the pinna and/or ear canal. The sliding movement is defined in at least one of the three directions of sliding movement and the rotational movement is defined in at least one of the three directions of rotational movement. As illustrated in FIG. 4, in consideration of an evaluation plane 400, the freedom of movement include at least one of longitudinal sliding movement along a longitudinal axis 405, lateral sliding movement along a lateral axis 410, vertical sliding movement along a vertical axis 415, longitudinal axis rotation 420 around the longitudinal axis, lateral axis rotation 425 around the lateral axis, vertical axis rotation 430 around the vertical axis and any combination thereof (as illustrated in FIG. 4). The "longitudinal" is along length of the evaluation plane, the "lateral" is along width of the evaluation plane, and "vertical" is along surface normal to the evaluation plane. The evaluation plane is defined later in relation to a combination of at least two RPPs. Thus, it is apparent that movements in different directions and orientation is possible. Therefore, restrictive movement or substantially restrictive movement of the ear mold within the pinna and/or ear canal may have to be determined against a combination of these possible different freedoms of movement. For example, the predetermined criteria may only include evaluating longitudinal sliding movement, lateral sliding movement, longitudinal axis rotation, and vertical axis rotation. Other combinations as part of predetermined criteria are also within scope of this disclosure.

The restrictive movement is defined as no or negligible movement of the custom-made earmold in the pinna and/or ear canal when the custom-made earmold is positioned and mechanically locked in the pinna and/or ear mold. The "substantially" restrictive movement allows for slight movement of the mechanically locked custom-fit earmold in the pinna and/or ear canal, while retaining the custom-fit earmold using mechanical anatomical locking. Such movement allows for self-adjustment of the custom-fit earmold, without dislodging the earmold out of the pinna and/or ear canal, in accordance with the movement of the pinna and/or ear canal. This allows for avoiding or reducing discomfort or pain to the user because of absolutely static positioning the earmold even when there are momentary changes in anatomical surface, for example because of one or more of motion induced activities like jaw movement, other daily activities, user lifestyle based activities, ear elasticity, etc.

FIG. 5 illustrates analysis 500 of the two retention points in combination according to an aspect of the disclosure. In a sub-aspect, a pair basis analysis includes at 505 selecting and pairing two RPPs, and at 510 determining whether the two RPPs in combination satisfy the predetermined criteria of restrictive movement and/or substantial restrictive movement. If so, then at 515 the analysed two RPPs may be used as the two retention points of the at least two retention points for modeling the custom-fit earmold. If not, then at 520 the individual RPPs may be used again in a different pair basis combination for determining whether the predetermined criteria is met in the different pair basis combination and for identifying the retention point(s). A technique that allows for evaluating the sliding and/or rotation movement at each RPPs of the two RPPs may be used.

For example, FIG. 6A illustrates a movement evaluation technique 600 for a pair basis RPPs according to an aspect of the disclosure and FIG. 6B illustrates a three-dimensional image showing a movement evaluation technique according to an aspect of the disclosure. The numerals in parenthesis relate to FIG. 6B, whereas the numerals not in parenthesis relate to FIG. 6A. At 605, a pair basis comprising a first RPP (640) and a second RPP (645) is selected using a selector tool. At 610, a line (650) connecting the first RPP and the second RPP is defined using a draw tool. At 615, a first evaluation plane (655) containing the first RPP (640) and perpendicular to the connecting line (650) is defined using the draw tool. At 620, a second evaluation plane (660) containing the second RPP (645) and perpendicular to the connecting line (650) is defined using the draw tool. At 625, the sliding movement and rotational movement of the first evaluation plane (655) and the second evaluation plane (660) when connected with each other using the connecting line (650) is evaluated with respect to the pinna and/or ear canal using a determination module. At 630, a determination is made whether the first evaluation plane (655) and the second evaluation plane (660) when connected using the connecting line (650) satisfy the predetermined criteria, i.e. restrictive or substantially restrictive sliding and/or rotational movement of the ear mold, comprising at least two RPPs as retention points, with respect to the pinna and/or ear canal. If so, then at 515 the analysed two RPPs (640 and 645) may be used as the two retention points of the at least two retention points for modeling the custom-fit earmold. If not, then at 520 the individual RPPs (640/645) may be used again in a different pair basis combination for determining whether the predetermined criteria is met in the different pair basis combination and for identifying the retention point(s).

FIG. 7A illustrates a movement evaluation technique for a pair basis RPPs according to an aspect of the disclosure and FIG. 7B illustrates a multi-dimensional image showing a movement evaluation technique for a pair basis RPPs according to an aspect of the disclosure. The numerals in parenthesis relate to FIG. 7B, whereas the numerals not in parenthesis relate to FIG. 7A. At 605, a pair basis comprising a first RPP (640) and a second RPP (645) is selected using a selector tool. At 705, a close polynomial surface such as a closed polynomial surface (715, illustrated by a sphere) containing the first RPP and the second RPP at the surface (720) of the close polynomial surface is defined using a draw tool. One of the axis (725) of the close polynomial surface may be equal to a connecting length (730) of a line connecting the first RPP and the second RPP. For example, in case of a sphere, diameter (725) of the sphere (720) is equal to the connecting length (730) and the first RPP (640) and the second RPP (645) lie on the surface (720) of the sphere. In another example, where an ellipsoid is used, either major axis or minor axis is equal to the connecting length and the first RPP and second RPP lie of the surface of the ellipsoid. At 735, evaluating, using the determination module, sliding and/or rotational movement of the close polynomial surface having the first RPP and the second RPP at the surface of the close polynomial surface with respect to the pinna and/or ear canal. Thereafter, at 710 determining whether the evaluated movement satisfy the predetermined criteria, i.e. restrictive or substantially restrictive sliding and/or rotational movement of the ear mold, comprising at least two RPPs as retention points, with respect to the pinna and/or ear canal. If so, then, then at 515 the analysed two RPPs (640 and 645) may be used as the two retention points of the at least two retention points for modeling the custom-fit earmold. If not, then at 520 the individual RPPs (640/645) may be used again in a different pair basis combination for determining whether the predetermined criteria is met in the different pair basis combination and for identifying the retention point(s).

Additionally or alternatively, a combination of at least three RPPs in the extra-pair basis is evaluated to determine whether the at least three RPPs in combination satisfy the predetermined criteria. FIG. 8 illustrates a three-dimensional image showing a movement evaluation technique for an extra-pair basis RPPs according to an aspect of the disclosure. The extra-pair basis includes a first RPP 640, a second RPP 645 and a third RPP 805, which are selected using a selector tool from the plurality of RPPs. A first line 650 connecting the first RPP 640 and the second RPP 645 is defined using a draw tool. A second line 810 connecting the second RPP 645 with the third RPP 805 is defined using the draw tool. A third line 815 connecting the third RPP 805 and the first RPP 640 is defined using the draw tool. At the first RPP 640, i) a first evaluation plane 655 containing the first RPP 640 and perpendicular to the first line 650 is defined using the draw tool, and ii) a fourth evaluation plane 655' containing the first RPP 640 and perpendicular to the third line 815 is defined using the draw tool. At the second RPP 645, i) a second evaluation plane 660 containing the second RPP 645 and perpendicular to the first line 650 is defined using the draw tool, and ii) a fifth evaluation plane 660' containing the second RPP 645 and perpendicular to the second line 810 is defined using the draw tool. At the third RPP 805, i) a third evaluation plane 820 containing the third RPP 805 and perpendicular to the second line 810 is defined using the draw tool, and ii) a sixth evaluation plane 820' containing the third RPP 805 and perpendicular to the third line 815 is defined using the draw tool. The sliding movement and rotational movement of the first evaluation plane 655, second evaluation plane 660, third evaluation plane 820, fourth evaluation plane 655', fifth evaluation plane 660', and sixth evaluation plane 820' when connected with one another using the first line 650, second line 810 and third line 815 is evaluated using the determination module. A determination, using the determination module, is made whether the first evaluation plane 655, second evaluation plane 660, third evaluation plane 820, fourth evaluation plane 655', fifth evaluation plane 660', and sixth evaluation plane 820' when connected with one another using the first line 650, second line 810 and third line 815 satisfy the predetermined criteria restrictive or substantially restrictive sliding and/or rotational movement of the ear mold, comprising at least three RPPs as retention points, with respect to the pinna and/or ear canal. If so, then the analysed three RPPs (640, 645, 805) may be used as the three retention points of the at least three retention points for modeling the custom-fit earmold. If not, then one of the RPPs from the first RPP, second RPP and third RPP may be combined with two different RPPs or two of the analyzed RPPs may be combined with a different RPP in an extra-pair basis for determining whether the predetermined criteria is met in the different extra pair basis combination and for identifying the retention point(s).

Additionally or alternatively; similar to the pair basis combination, a combination of at least three RPPs in the extra-pair basis is evaluated to determine whether the at least three RPPs in combination satisfy the predetermined criteria. The extra-pair basis includes a first RPP, a second RPP and a third RPP, which are selected, using a selector tool, from the plurality of RPPs. A close polynomial surface containing the first RPP, second RPP, and the third RPP at the surface of the close polynomial surface is defined using a draw tool. An evaluation, using a determination module, of the close polynomial surface is made for sliding and/or rotational movement of the close polynomial surface with respect to the pinna and/or ear canal. Thereafter, a determination is made whether the close polynomial surface satisfy the predetermined criteria restrictive or substantially restrictive sliding and/or rotational movement of the ear mold, comprising at least three RPPs as retention points, with respect to the pinna and/or ear canal. If so, then the analysed three RPPs (640, 645 and 805) may be used as the two retention points of the at least two retention points for modeling the custom-fit earmold. If not, then one of the RPPs from the first RPP, second RPP and third RPP may be combined with two different RPPs or two of the analyzed RPPs may be combined with a different RPP in an extra-pair basis for determining whether the predetermined criteria is met in the different extra pair basis combination and for identifying the retention point(s).

Although for simplicity reasons, only three RPPs of the at least three RPP combination are illustrated but it would be apparent to the skilled person that for identifying the retention points from the plurality of RPPs, more than three RPPs in the extra-pair basis utilizing the above-disclosed principle may also be used.

Thus, in an embodiment, the custom-fit eannold comprising the retention part comprising a structure adapted to lock anatomically with at least two retention points, selected from the plurality of RPPs in combination on the pair-basis or with at least three retention points selected from the plurality of RPPs in combination on extra-pair basis is modeled using a modeler. The locking is adapted to restrict sliding and/or rotational movement or substantially restrict sliding and/or rotational movement of the custom fit earmold with respect to the pinna and/or ear canal when the custom-fit earmold is positioned in the pinna and/or ear canal of the user.

In another aspect, a method for assigning point type categories to an RPP is disclosed. A first-, or second-, or higher order derivative of functions or approximations of functions describing a local surface surrounding an RPP is performed/calculated using a derivative unit. Based on the result, the RPP is categorized into a point type category using a classifier. Typically, at least two identified RPPs of the plurality of RPPs are categorized in the point type categories. This may also include performing such categorization for all identified RPPs. The categories typically include local maximum extrema, local minimum extrema, and local saddle types comprising big valley, small valley or spiral valley. Other mathematical techniques for determining the mentioned point types or other point types may be used and within the scope of this disclosure. For illustrative purposes, FIG. 9A shows an RPP point (645) that is categorized as a local extrema (Maximum) point, FIG. 9B shows an RPP point 645 categorized as a saddle point type, and FIG. 9C shows an RPP point 805 that is categorized as a local extrema (Minimum) point according to additional or alternative aspects of the disclosure. The ear volume side represents side of the pinna and/or ear canal where the earmold may be positioned. Although a limited number of point types are dislcosed, however, it is possible to use conventionally known technique to define a point type category and evaluate a point for the point type category. The point categorization technique may be used for determining restrictive movement or substantially restrictive movement of the ear mold with respect to pinna and/or ear canal when the ear mold is positioned within the pinna and/or ear canal. This determination of restrictive movement or substantially restrictive movement may generally be performed for a pair-wise combination of two RPPs of same or different point types; and/or for an extra-pair-wise combination of at least three RPPs, the three RPPs are selected from same point types, or partially same point types and different point types. The partially same point types refer to scenario where at least two RPPs are categorized in the same point type category. The pair wise and extra pair wise combination is defined by using a selector tool of the image analysis module.

In an aspect, the two RPPs are in a pair-wise combination. The two RPPs may belong to the same or different point types. Based on the point type categories the two RPPs belong to, a determination for the restrictive or substantial restrictive movement is made. This movement determines the freedom of movement in an event the two RPPs are chosen as the retention points for modeling the custom-fit earmold. The determination is based on a movement-point type mapping table. An exemplary movement-point type mapping table for a pair basis combination is included below.

TABLE 1

Exemplary Movement-Point type mapping table for a pair basis combination

| Exemplary Movement-Point type mapping table | First retention point-Extrema Second retention-Extrema | First retention point-Extrema Second retention point-Saddle point | First retention point-Saddle point Second retention point-Saddle point |
|---|---|---|---|
| Sliding movement meets predetermined criteria | Yes | Yes | Yes |
| Rotational movement meets predetermined criteria | No | Yes | Yes |

Such table may be prepared offline based on evaluation of a number of other three-dimensional images and made accessible during the processing of the three-dimensional image, which is being processed for identification of RPPs and/or retention point(s). This offline evaluation on the other multi-dimensional images may be performed by using the evaluation technique for a pair basis RPPs and extra-pair basis RPPs (disclosed earlier) and linking the evaluation result with point types evaluated. For example, if the pair basis offline evaluation of a saddle point type and an extrema point type satisfies the predetermined criteria, then the mapping table suggests that pair wise combination of such point types may be used as retention points. Therefore, if two RPPs with one being a saddle point type and another as an extrema is selected, then the two RPPs would meet the predetermined crtieria and may be used as two retention points. (illustrated in FIG. 11A)

Similarly, in another aspect, the table may also include accessible information based on extra pair basis evaluation and point type of at least three point types. In essence, if the extra pair basis evaluation of the at least three RPPs satisfy the predetermined criteria, then the point type of each of the evaluated RPP of the at least three RPP is identified, and lastly, the combination of the point types is stored in the mapping table as providing restrictive or substantially restrictive movement. For example, Table 1 indicates that two RPPs categorized as extrema point types will likely to fail in providing restrictive or substantially restrictive rotational movement along the vertical axis. However, three RPPs with each being categorized as the extrema point types will meet the predetermined criteria with respect to the rotational movement. (illustrated in FIG. 11B) Other combinations of point types for at least three RPPs is also possible.

FIG. 10 illustrates a method 1000 of preparing a mapping table according to an aspect of the disclosure. Preparing the mapping table for pair or extra pair wise combination includes: i) at 1005, selecting two or at least three RPPs using a selector tool, ii) at 1010, determining whether the two or at least three RPPs satisfy the predetermined criteria based on the pair basis or extra-pair basis evaluation, iii) if so, then at 1015 determining point types for the each RPP of the two or at least three RPPs, iv) if not, then at 1020 selecting a different RPP pair or extra pair in the pair or extra-pair basis, and v) for meeting the predetermined criteria at step ii, at 1025 preparing a mapping table entry following the step iii at 925 with point type combinations.

Thus, in an embodiment, a method for creating a searchable mapping table is disclosed. The method includes determining, using a determination module of the image analysis module, whether a pair-wise combination of at least two RPPs selected from same or different point types and/or an extra pair-wise combination of at least three RPPs selected from same, partially different or different point types provide restrictive or substantially restrictive sliding and/or rotational movement, with respect to the pinna and/or ear canal, of an ear mold comprising the retention part that is adapted to lock anatomically with retention points comprising the at least two RPPs or at least three RPPs when the ear mold is positioned within the pinna and/or ear canal. Thereafter, storing, in a searchable electronic mapping database adapted to be searched, the point types of the at least two RPPs of the pair wise combination and/or at least three RPPs of the extra pair wise combination along with an affirmative anatomical locking indication if the restrictive or substantial restrictive sliding and/or rotational movement is achieved. The phrase "affirmative anatomical locking indication" refers to when restrictive or substantially restrictive sliding and/or rotational movement, with respect to the pinna and/or ear canal, of an ear mold comprising the retention part that is adapted to lock anatomically with retention points comprising the at least two RPPs or at least three RPPs is achieved when the ear mold is positioned within the pinna and/or ear canal.

In another aspect, the method further includes determining, using the derivative unit and classifier of the image analysis module, point types for at least two RPPs or at least three RPPs selected from the plurality of RPPs of the obtained three dimensional image. The obtained three dimensional image may include a subsequent three dimensional image, i.e. a three dimension image different from the one based on which the mapping table is created. Thereafter, the searchable mapping table is searched to determine, using a comparator of the image analysis module, whether the at least two RPPs in pair-wise combination or at least three RPPs in extra pair wise combination provide restrictive or substantially restrictive sliding and/or rotational movement of an ear mold comprising the retention part adapted to lock anatomically with retention points comprising the at least two RPPs or the at least three RPPs with respect to the pinna and/or ear canal when the ear mold is positioned within the pinna and/or ear canal . The determination being based on comparing whether the point types of the at least two RPPs in combination and the at least three RPPs represent point types combination indicating affirmative locking indication. The search in the mapping table may be performed by providing a search tool that may include drop down field combination search menu. For example, Search Field 1 comprising a drop down point type menu with an AND operator with a Search Field 2 comprising a drop down point type menu and so on. The drop down menu may provide options of selecting different point types such as saddle or maximum extrema or minimum extrema. In one such implementation, if saddle is chosen from Search Field 1 and extrema maximum on opposite side to the saddle for Search Field 2, then the result would give an affirmative anatomical locking indication. Other known search techniques allowing combination of different point types may also be employed.

In an aspect, the multi-dimensional image along with information relating to the plurality of RPPs and/or retention point(s) and/or RPP point types and/or retention point(s) used in the custom-fit earmold for the user is stored into an electronic locally available or remote database. As an additional step, individual searchable strings may also be associated to the plurality of RPPs and/or retention point(s) and/or RPP point types and/or retention point(s) used in the custom-fit earmold; and the searchable strings are then stored into the electronic database for subsequent searching and retrieval of the stored multi-dimensional image and the stored information.

In another aspect, a search is performed at the electronic database using at least one of the individual searchable strings and retrieving the stored information and/or the stored multi-dimensional image. As an additional step, the retrieved stored information is compared with a subsequent multi-dimensional image of the pinna and/or ear canal of the user by determining variation in the plurality of RPPs with respect to a subsequent plurality of RPPs, and/or in the retention point(s) with respect to a subsequent retention point(s) and/or in RPP point types with respect to subsequent RPP point types; and a subsequent custom-fit earmold may be modeled based on the determined variation.

According to another embodiment, a hearing aid comprising a custom-fit ear mold is disclosed. The custom fit ear mold includes a retention part comprising a structure adapted to lock anatomically with at least one point at a surface of the pinna and/or ear canal when the custom-fit earmold is positioned in the pinna and/or ear canal of the user. The at least one point represents at least one retention point selected from the plurality of retention possibility points (RPPs), wherein each RPP of the plurality of the RPPs comprises a point wherein a normal, at the RPP, to a tangent plane containing the RPP intersects at another point at surface of the pinna and/or ear canal such that the another point is proximal to a tympanic membrane of the user compared to position of the RPP relative to the tympanic membrane.

The hearing aid comprises the retention part, which includes a structure adapted to lock anatomically with at least two or at least three points at a surface of the pinna and/or ear canal when the custom-fit earmold is positioned in the pinna and/or ear canal of the user, the at least two or at least three points representing at least two RPPs and/or at least three RPPs. The at least two RPPs in combination provide restrictive or substantially restrictive sliding and/or rotational movement of the ear mold with respect to the pinna and/or ear canal when the ear mold is positioned within the pinna and/or ear canal. Additionally or alternatively, the at least three RPPs in combination provide restrictive or substantially restrictive sliding and/or rotational movement of the ear mold with respect to the pinna and/or ear canal when the ear mold is positioned within the pinna and/or ear canal.

The identification of the at two RPPs and/or at least three RPPs and the retention points is in accordance with the method disclosed in the preceding paragraphs.

According to an embodiment, an ear mold adapted to be worn by a user is disclosed. The ear mold is configured to be worn in the ear and/or in the ear canal of the user. The ear mold may constitute an i) in-the-ear type hearing aid, or ii) in-the-canal type hearing aid, or iii) completely-in-canal type hearing aid, or iv) is an ear mold for a behind-the-ear type hearing aid with or without receiver in the ear. The ear mold comprises at least one electroencephalogram (EEG) electrode on surface of the ear mold such that the at least one EEG electrode is positioned at one or more retention points. The one or more retention point is selected from the plurality of retention possible points (RPPs).

The EEG electrode is adapted to pick up EEG signal from the user. The EEG signal provides a measurement and recording of electrical activity in user's brain by measuring the electrical potential generate on skin surface of the user, indicating cognitive load of the user based on the user's working memory capacity. Positioning the EEG electrodes at the RPP allows for good skin contact, thus facilitating stable and reliable EEG signals. Inclusion of the EEG electrode at one of the RPPs further allows for avoiding exerting additional mechanical pressure on the ear or ear canal, thus maximizing wearing comfort. In an embodiment, the point of electrical contact of the EEG electrode coincides with a small approximately circular area having a center at one of the RPPs. The circular area may include a radius in the range of 1 mm to 6 mm.

The hearing aid may further include a signal analyzer adapted to receive the EEG signal and to monitor and/or analyze the EEG signal. Additionally or alternatively, the hearing aid may be adapted to transmit the EEG signal to an external processing unit that is adapted to receive, monitor and/or analyze the EEG signal from the user. In different embodiments, different processing steps may be performed in accordance with output of the analysis. For example, the hearing aid component such as a processor may be adapted to adjust the hearing aid settings in according with an output of the analyzed EEG signal. Additionally or alternatively, the hearing aid may be adapted to receive electronic instruction from an external unit, the electronic instruction being based on the analyzed EEG signal and adapted to adjust the setting of the hearing aid. Customizing hearing aid in accordance with EEG signal is further disclosed in EP 2571289, which is incorporated herein by reference.

In the described embodiments, the ear mold is manufactured of partly flexible material such as thermoplastic elastomers or silicone. For positioning the EEG electrode, an additional stiffness in and/or around the points where the electrodes are located. This may be implemented by 2K molding techniques or by 3D printing technologies using more than one material.

According to another embodiment, a computing device for producing a custom-fit earmold adapted to be securely retained in a pinna and/or ear canal of a user is disclosed, as illustrated in FIG. 12. The device includes a processing unit 1205 adapted to run an image analysis module 1260. The image analysis module 1260 may include at least or more of a selector tool 1210, a draw tool 1215, an identifier 1220, a derivative unit 1225, a classifier 1230, determination module 1235, a modeler 1240, and a user interface 1245. The image analysis tool may further include a mapping generator 1250 adapted to generate a mapping table, and a forecasting engine 1255. The device may further include a transmitter 1265, a receiver 1270, and a memory 1275. The device may further be adapted to communicate with a storage unit 1280, a display unit 1290, and a scanning unit 1285. The bi-directional arrows show communication channel such as a databus between different components of the system.

According to an embodiment, the image analysis module 1260 includes an identifier 1220 adapted to identify a plurality of retention possibility points (RPPs) from a plurality of points available at an inner surface of a three-dimensional image of the pinna and/or ear canal; the plurality of points representing corresponding points at a surface of the pinna and/or ear canal. The image analysis module 1260 is further adapted to define a tangent plane containing the analyzed point; define a normal, at an analyzed point, to the defined tangent; determine whether the defined normal intersects at another point at the inner surface of the three-dimensional image; and designate the analyzed point as RPP if the another point is proximal to a tympanic membrane of the user compared to position of the analyzed point relative to the tympanic membrane. The device further includes a selector tool 1210 and a modeler 1240. The selector tool 1210 is adapted to select at least one retention point from the plurality of RPPs. The modeler 1240 is adapted to utilize the at least one retention point for developing a three-dimensional mathematical image representation of the custom-fit earmold comprising the retention part adapted to lock anatomically with at least one point at the surface of the pinna and/or ear canal when the custom-fit earmold is positioned in the pinna and/or ear canal of the user, the at least one point being represented by at least one retention point selected from the plurality of RPPs.

The selector 1210 may further be adapted to select at least one retention point from the plurality of RPPs; and a modeler 1240 adapted to utilize the at least one retention point in order to model the custom-fit earmold. The device may also include a memory 1275 for storing the multi-dimensional image and information relating to the RPPs and/or point types and/or retention points and/or predetermined criteria or the electronically searchable mapping table. The determination module 1235 may include a routine that based on the identification of RPPs may be configured to automatically select at least one or more RPPs based on a predefined principles for example RPPs satisfying the predetermined criteria to model the custom-fit earmold. Other implementations may also be used for example; modeler may be configured to receive manual selection of RPP(s) and modeling the custom-fit ear mold based on such manually selected RPP(s).

The device may include additional functional units in order to perform steps included in the disclosed method. For example, the system, using a receiver 1270, is adapted to obtain multi-dimensional image from a scanning unit 1285 or an external storage device 1280, which may also be configured to store mapping table. Similarly, the device, using a transmitter 1265, is adapted to transmit data related to displaying three-dimensional image and the processing steps on a display unit 1290, which may also be adapted to display the modeled custom ear fit earmold. The processing unit 1205 is also adapted to at least read instructions of a computer program product in order to allow the system to execute steps included in the disclosed method step. The identifier 1205 may further include a derivative unit 1225 and/or classifier 1230 for evaluating points of the three-dimensional image and categorizing the evaluated points in a point type category and generating a mapping table using a mapping generator 1250. The device may also be adapted to receive user commands using a user interface 1245 like setting the predetermined criteria, selecting the point for analysis, etc. A forecasting engine 1255 may also be included to allow forecasting the anatomy of the pinna and/or ear canal.

The device is adapted to communicate with external units like scanning unit, storage unit, display either through a wired or wireless connection. The internal components of the computing device typically communicate using a bidirectional communication bus. It is apparent that depending upon the requirements, one or more recited features may become redundant for modeling the custom-fit earmold. For example, it is not necessary that the three-dimensional image is always received from an external storage unit 1255 or a forecasting engine 1275 is necessarily required.

The transmitter 1265 may be adapted to provide the developed three dimensional mathematical image representation of the custom fit ear mold to a manufacturing unit such as a 3-D printer or other known devices to allow modeling that includes manufacturing of the custom fit eat mold. The manufactured ear mold may be made of known materials such as vinyl, acrylic or silicone.

Different components of the device and in particular of the image analysis module are individually adapted to perform specific method steps that are already recited in relation to the related component in the disclosed method in preceding paragraphs. For example, the draw tool 1215 is adapted to define a connecting line and/or evaluation plane.

According to yet another embodiment, a computer program product is disclosed. The computer program product includes instructions, which when executed by the computing device, causes the device to identify a plurality of retention possibility points (RPPs) from a plurality of points available at an inner surface of a three-dimensional image of the pinna and/or ear canal; the plurality of points representing corresponding points at a surface of the pinna and/or ear canal. The identification includes defining a tangent plane containing the analyzed point, defining a normal, at an analyzed point, to the defined tangent, determining whether the defined normal intersects at another point at the inner surface of the three-dimensional image, and designating the analyzed point as RPP if the another point is proximal to a tympanic membrane of the user compared to position of the analyzed point relative to the tympanic membrane. The execution of the instructions further causes the device to select at least one retention point from the plurality of RPPs; and utilize the at least one retention point for developing a three-dimensional mathematical image representation of the custom-fit earmold comprising the retention part adapted to lock anatomically with at least one point at the surface of the pinna and/or ear canal when the custom-fit earmold is positioned in the pinna and/or ear canal of the user, the at least one point being represented by at least one retention point selected from the plurality of RPPs.

The computer program product may include further instructions that relate to any or all of the steps required to perform the disclosed method.

It should be appreciated that reference throughout this specification to "one embodiment" or "an embodiment" or features included as "may" means that a particular feature, structure or characteristic described in connection with the embodiment is included in at least one embodiment of the disclosure. Therefore, it is emphasized and should be appreciated that two or more references to "an embodiment" or "one embodiment" or "an alternative embodiment" or features included as "may" in various portions of this specification are not necessarily all referring to the same embodiment. Furthermore, the particular features, structures or characteristics may be combined as suitable in one or more embodiments of the disclosure.

Throughout the foregoing description, for the purposes of explanation, numerous specific details. were set forth in order to provide a thorough understanding of the disclosure. It will be apparent, however, to one skilled in the art that the disclosure may be practised without some of these specific details.

Accordingly, the scope should be judged in terms of the claims that follow.

The invention claimed is:

1. A method for modeling a custom-fit earmold adapted to be securely retained in a pinna and/or ear canal of a user, the method comprising
    obtaining a three-dimensional image of the pinna and/or ear canal of the user, the three-dimensional image comprising a plurality of points available at an inner surface of the image wherein the plurality of points represent corresponding points at a surface of the pinna and/or ear canal;
    processing, using a processing unit adapted to run an image analysis module comprising an identifier on a computing device, the three-dimensional image for identifying a plurality of retention possibility points (RPPs) from the plurality of points, wherein the identifying the plurality of RPPs comprises designating an analyzed point selected, using a selector tool of the image analysis module, from the plurality of points as an RPP if a normal, at the analyzed point, to a tangent plane containing the analyzed point intersects at another point at the inner surface of the three-dimensional image, the another point being proximal to a tympanic membrane of the user compared to position of the analyzed point relative to the tympanic membrane; and
    modeling, using a modeler of the image analysis module, the custom-fit earmold comprising a retention part comprising a structure adapted to lock anatomically with at least one point at the surface of the pinna and/or ear canal when the custom-fit earmold is positioned in the pinna and/or ear canal of the user, the at least one point being represented by at least one retention point selected from the plurality of RPPs.

2. The method according to claim 1, wherein the modeling the custom fit earmold comprises
    developing, using the modeler of the image analysis module, a three-dimensional mathematical image representation of the custom-fit earmold comprising the retention part that is adapted to lock anatomically with one or more retention point(s) selected from the plurality of RPPs; and/or
    manufacturing the custom-fit earmold comprising the retention part adapted to lock anatomically with the at least one point at the surface of the pinna and/or ear canal when the custom-fit earmold is positioned in the pinna and/or ear canal of the user, the earmold being made of a material selected from a group consisting of acrylic, vinyl, and silicone.

3. The method according to claim 1, further comprising
    calculating a derivative, using a derivative unit of the image analysis module, a first-, or second-, or higher order derivative of functions or approximations of functions describing a local surface surrounding the RPP; and
    categorizing, using a classifier of the image analysis module, an RPP of the plurality of identified RPPs in a point type category in accordance with the first-, or second-, or higher order derivative of functions or approximations of functions describing a local surface surrounding the RPP.

4. The method according to claim 3, wherein the point type category is selected from a group consisting of local maximum extrema, local minimum extrema, and local saddle types comprising big valley, small valley or spiral valley.

5. The method according to claim 3, further comprising
defining, using a selector tool of the image analysis module, a pair-wise combination of at least two RPPs selected from a group consisting of same or different point types; and/or defining, using a selector tool of the image analysis module, an extra-pair-wise combination of at least three RPPs selected from a group consisting of same point types, partially same point types and different point types.

6. The method according to claim 1, further comprising determining, using a determination module of the image analysis module, restrictive or substantially restrictive sliding and/or rotational movement of the ear mold, comprising at least two RPPs as retention points, with respect to the pinna and/or ear canal, the determination comprises
   i) selecting, using a selector tool of the image analysis module, a first RPP and a second RPP;
   ii) defining, using a draw tool of the image analysis module, a connecting line between the first RPP and the second RPP;
   iii) defining, using a draw tool of the image analysis module, a first evaluation plane containing the first RPP and perpendicular to the connecting line and defining a second evaluation plane containing the second RPP and perpendicular to the connecting line; and
   iv) evaluating, using the determination module of the image analysis module, the sliding movement and rotational movement of the first evaluation plane and the second evaluation plane with respect to the pinna and/ear canal when the first evaluation plane and the second evaluation plane are connected using the connecting line.

7. The method according to claim 1, further comprising determining, using a determination module of the image analysis module, restrictive or substantially restrictive sliding and/or rotational movement of the ear mold, comprising at least two RPPs as retention points, with respect to the pinna and/or ear canal, the determination comprises
   i) selecting, using a selector tool of the image analysis module, a first RPP and a second RPP;
   ii) defining, using a draw tool of the image analysis module, a close polynomial surface containing the first RPP and the second RPP at a surface of the close polynomial surface such that at least one axis of the close polynomial surface is equal to a distance between the first RPP and second RPP; and
   iii) evaluating, using the determination module of the image analysis module, the sliding movement and rotational movement of the close polynomial surface with respect to the pinna and/ear canal.

8. The method according to claim 1, further comprising determining, using a determination module of the image analysis module, restrictive or substantially restrictive sliding and/or rotational movement of the ear mold, comprising at least three RPPs as retention points, with respect to the pinna and/or ear canal, the determination comprising
   i) selecting, using a selector tool of the image analysis module, a first RPP, a second RPP, and a third RPP from the plurality of RPPs;
   ii) defining, using a draw tool of the image analysis module, a first line connecting the first RPP and the second RPP, a second line connecting the second RPP with the third RPP and a third line connecting the third RPP and the first RPP;
   iii) defining, at the first RPP using a draw tool of the image analysis module, a first evaluation plane containing the first RPP and perpendicular to the first line, and a fourth evaluation plane containing the first RPP and perpendicular to the third line;
   iv) defining, at the second RPP using a draw tool of the image analysis module, a second evaluation plane containing the second RPP and perpendicular to the first line and a fifth evaluation plane containing the second RPP and perpendicular to the second line;
   v) defining, at the third RPP using a draw tool of the image analysis module, a third evaluation plane containing the third RPP and perpendicular to the second line and a sixth evaluation plane containing the third RPP and perpendicular to the third line; and
   vi) evaluating, using the determination module of the image analysis module, sliding movement and rotational movement of the first evaluation plane, second evaluation plane, third evaluation plane, fourth evaluation plane, fifth evaluation plane, and sixth evaluation plane with respect to pinna and/or ear canal when the first RPP, second RPP and third RPP are connected with one another using the first line, second line and third line respectively.

9. The method according to claim 1, further comprising determining, using a determination module of the image analysis module, restrictive or substantially restrictive sliding and/or rotational movement of the ear mold, comprising at least three RPPs as retention points, with respect to the pinna and/or ear canal, the determination comprising
   i) selecting, using a selector tool of the image analysis module, a first RPP, a second RPP, and a third RPP from the plurality of RPPs;
   ii) defining, using a draw tool of the image analysis module, a close polynomial surface containing the first RPP, second RPP, and the third RPP at the surface of the close polynomial surface; and
   iii) evaluating, using the determination module of the image analysis module, the sliding movement and rotational movement of the close polynomial surface with respect to the pinna and/or ear canal.

10. The method according to claim 1, further comprising modeling, using a modeler of the image analysis module, the custom-fit earmold comprising the retention part comprising a structure adapted to lock anatomically with at least at least two retention points, selected from the plurality of RPPs, in combination on the pair-basis or comprising at least three retention points, selected from the plurality of RPPs, in combination on extra-pair basis such that the locking restricts sliding and/or rotational movement or substantially restrict sliding and/or rotational movement of the custom fit earmold with respect to the pinna and/or ear canal lock when the custom-fit earmold is positioned in the pima and/or ear canal of the user.

11. The method according to claim 1, further comprising determining, using a determination module of the image analysis module, whether a pair-wise combination of at least two RPPs selected from same or different point types and/or an extra pair-wise combination of at least three RPPs selected from same, partially different or different point types provide restrictive or substantially restrictive sliding and/or rotational movement, with respect to the pinna and/or ear canal, of an ear mold comprising the retention part that is adapted to lock anatomically with retention points comprising the at least two RPPs or at least three RPPs when the ear mold is positioned within the pinna and/or ear canal;

storing, in a searchable electronic mapping database adapted to be searched, the point types of the at least two RPPs of the pair wise combination and/or at least three RPPs of the extra pair wise combination along with an affirmative anatomical locking indication if the restrictive or substantial restrictive sliding and/or rotational movement is achieved.

12. The method according to claim 11, further comprising determining, using the derivative unit and classifier of the image analysis module, point types for at least two RPPs or at least three RPPs selected from the plurality of RPPs of the obtained three dimensional image; and searching the searchable mapping table to determine, using a comparator of the image analysis module, whether the at least two RPPs in pair-wise combination or at least three RPPs in extra pair wise combination provide restrictive or substantially restrictive sliding and/or rotational movement of an ear mold comprising the retention part adapted to lock anatomically with retention points comprising the at least two RPPs or the at least three RPPs with respect to the pinna and/or ear canal when the ear mold is positioned within the pinna and/or ear canal, the determination being based on comparing whether the point types of the at least two RPPs in combination and the at least three RPPs represent point types combination indicating affirmative locking indication.

13. A hearing aid comprising a custom-fit ear mold, the custom fit ear mold comprising a retention part comprising a structure adapted to lock anatomically with at least one point at a surface of the pinna and/or ear canal when the custom-fit earmold is positioned in the pinna and/or ear canal of the user, the at least one point representing at least one retention point selected from the plurality of retention possibility points (RPPs), wherein each RPP of the plurality of the RPPs comprises a point wherein a normal, at the RPP, to a tangent plane containing the RPP is configured to intersect at another point at surface of the pinna and/or ear canal such that the another point is proximal to a tympanic membrane of the user compared to position of the RPP relative to the tympanic membrane.

14. The hearing aid according to claim 13, wherein the retention part comprising a structure adapted to lock anatomically with at least two or at least three points at a surface of the pinna and/or ear canal when the custom-fit earmold is positioned in the pinna and/or ear canal of the user, the at least two or at least three points representing at least two RPPs and/or at least three RPPs, wherein
the at least two RPPs in combination provide restrictive or substantially restrictive sliding and/or rotational movement of the ear mold with respect to the pinna and/or ear canal when the ear mold is positioned within the pinna and/or ear canal; and/or
the at least three RPPs in combination provide restrictive or substantially restrictive sliding and/or rotational movement of the ear mold with respect to the pinna and/or ear canal when the ear mold is positioned within the pinna and/or ear canal.

15. The hearing aid according to claim 13, further comprising at least one Electroencephalography (EEG) electrode positioned at one or more retention points, the retention points being selected from a plurality of RPPs.

16. The hearing aid according to claim 15, wherein the EEG electrode comprises an electrical contact that comprises a circular area having a center at one of the RPPs, the circular area including a radius in the range of 1mm to 6 mm.

17. A computing device for producing a custom-fit earmold adapted to be securely retained in a pinna and/or ear canal of a user, the device comprises a processing unit adapted to run an image analysis module comprising
an identifier adapted to identify a plurality of retention possibility points (RPPs) from a plurality of points available at an inner surface of a three-dimensional image of the pinna and/or ear canal; the plurality of points representing corresponding points at a surface of the pinna and/or ear canal and the identifier is adapted to
define a tangent plane containing the analyzed point,
define a normal, at an analyzed point, to the defined tangent,
determine whether the defined normal intersects at another point at the inner surface of the three-dimensional image,
designate the analyzed point as RPP if the another point is proximal to a tympanic membrane of the user compared to position of the analyzed point relative to the tympanic membrane
a selector tool adapted to select at least one retention point from the plurality of RPPs; and
a modeler adapted to utilize the at least one retention point for developing a three-dimensional mathematical image representation of the custom-fit earmold comprising the retention part adapted to lock anatomically with at least one point at the surface of the pinna and/or ear canal when the custom-fit earmold is positioned in the pinna and/or ear canal of the user, the at least one point being represented by at least one retention point selected from the plurality of RPPs.

18. A non-transitory computer readable medium having stored thereon a computer program that is executed by a computer to
identify a plurality of retention possibility points (RPPs) from a plurality of points available at an inner surface of a three-dimensional image of the pinna and/or ear canal; the plurality of points representing corresponding points at a surface of the pinna and/or ear canal and, the identification comprises
defining a tangent plane containing the analyzed point,
defining a normal, at an analyzed point, to the defined tangent,
determining whether the defined normal intersects at another point at the inner surface of the three-dimensional image,
designating the analyzed point as RPP if the another point is proximal to a tympanic membrane of the user compared to position of the analyzed point relative to the tympanic membrane
select at least one retention point from the plurality of RPPs; and
utilize the at least one retention point for developing a three-dimensional mathematical image representation of the custom-fit earmold comprising the retention part adapted to lock anatomically with at least one point at the surface of the pinna and/or ear canal when the custom-fit earmold is positioned in the pinna and/or ear canal of the user, the at least one point being represented by at least one retention point selected from the plurality of RPPs.

* * * * *